United States Patent [19]

Shwartz

[11] Patent Number: 5,584,024
[45] Date of Patent: Dec. 10, 1996

[54] INTERACTIVE DATABASE QUERY SYSTEM AND METHOD FOR PROHIBITING THE SELECTION OF SEMANTICALLY INCORRECT QUERY PARAMETERS

[75] Inventor: Steven P. Shwartz, Orange, Conn.

[73] Assignee: Software AG, Germany

[21] Appl. No.: 217,099

[22] Filed: Mar. 24, 1994

[51] Int. Cl.⁶ .............................. G06F 17/30; G06F 17/27
[52] U.S. Cl. ...................... 395/604; 395/922; 395/757; 364/274.2; 364/275.4; 364/283.3; 364/DIG. 1; 364/972.2; 364/974.6; 364/DIG. 2
[58] Field of Search .................................... 395/600, 922; 364/419.01, 419.07, 974.6, 972.2, 274.2, 274.7, 275.1, 275.4, 283.3, 282.1

[56] References Cited

U.S. PATENT DOCUMENTS

| | | | |
|---|---|---|---|
| 4,506,326 | 3/1985 | Shaw et al. | 364/300 |
| 4,688,195 | 8/1987 | Thompson et al. | 364/300 |
| 4,689,737 | 8/1987 | Grant | 364/200 |
| 4,736,296 | 5/1988 | Katayama et al. | 364/419 |
| 4,811,207 | 3/1989 | Hikita et al. | 364/200 |
| 4,829,423 | 5/1989 | Tennant et al. | 364/200 |
| 4,839,853 | 6/1989 | Deerwester et al. | 364/900 |
| 4,914,590 | 3/1990 | Loatman et al. | 364/419 |
| 4,930,071 | 5/1990 | Tou et al. | 364/300 |
| 4,931,935 | 5/1990 | Ohira et al. | 364/419 |
| 4,943,933 | 7/1990 | Miyamoto et al. | 364/513 |
| 4,974,191 | 11/1990 | Amirghodsi et al. | 364/900 |
| 4,994,967 | 2/1991 | Asakawa | 364/419 |
| 5,099,426 | 3/1992 | Carlgren et al. | 364/419 |
| 5,175,814 | 12/1992 | Anick et al. | 395/161 |
| 5,197,005 | 3/1993 | Shwartz et al. | 395/600 |
| 5,204,947 | 4/1993 | Bernstein et al. | 395/157 |
| 5,237,502 | 8/1993 | White et al. | 364/419 |
| 5,255,386 | 10/1993 | Prager | 395/600 |
| 5,265,014 | 11/1993 | Haddock et al. | 364/419 |
| 5,265,065 | 11/1993 | Turtle | 395/600 |
| 5,349,526 | 9/1994 | Potts, Sr. et al. | 364/419.1 |
| 5,386,556 | 1/1995 | Hedim et al. | 395/600 |

FOREIGN PATENT DOCUMENTS

| | | | |
|---|---|---|---|
| 0287310 | 10/1988 | European Pat. Off. | G06F 15/40 |
| 0387226 | 9/1990 | European Pat. Off. | G06F 15/38 |
| 63-219034 | 9/1988 | Japan | G06F 7/28 |

OTHER PUBLICATIONS

Wu, "A Knowledge-Based Database Assistant With A Menu Based Natural Language User-Interface" 10 Oct. 1993, IEICI: Trans. Inf. & Syst. V. E76-D N. 10 pp. 1276–1287.

(List continued on next page.)

*Primary Examiner*—Wayne Amsbury
*Assistant Examiner*—Jack M. Choules
*Attorney, Agent, or Firm*—Howrey & Simon; C. Scott Talbot; Thomas G. Woolston

[57] ABSTRACT

A database query system includes a query assistant that permits the user to enter only queries that are both syntactically and semantically valid (and that can be processed by an SQL generator to produce semantically valid SQL). Through the use of dialog boxes, a user enters a query in an intermediate English-like language which is easily understood by the user. A query expert system monitors the query as it is being built, and using information about the structure of the database, it prevents the user from building semantically incorrect queries by disallowing choices in the dialog boxes which would create incorrect queries. An SQL generator is also provided which uses a set of transformations and pattern substitutions to convert the intermediate language into a syntactically and semantically correct SQL query.

The intermediate language can represent complex SQL queries while at the same time being easy to understand. The intermediate language is also designed to be easily converted into SQL queries. In addition to the query assistant and the SQL generator, an administrative facility is provided which allows an administrator to add a conceptual layer to the underlying database making it easier for the user to query the database. This conceptual layer may contain alternate names for columns and tables, paths specifying standard and complex joins, definitions for virtual tables and columns, and limitations on user access.

27 Claims, 26 Drawing Sheets

OTHER PUBLICATIONS

Wu et al, "KDA: A Knowledge–Based Database Assistant With Query Guiding Facility" 5 Oct. 1992, pp. 443–453, IEEE Transactions On Knowledge & Data Eng. V. 4 N. 5.

Cha, "Kaleidoscope: A Cooperative Menu Guided Query Incrface (SQL Version)," 1990, IEEE, Artifical Intelligence Applications.

Whitaker and Bonnell "Functional Modelling Of Intelligent Systems Using A Blackboard Model" 1992, pp. 1 to 12, The Journal Of Knowledge Eng. V 5, N. 1.

Winston, P., "Language Understanding," *Artificial Intelligence*, 9:291–334 (1984).

Rich, E., "Natural Lanugage Interfaces," *Computer*, pp. 39–47 (Sep. 1984).

Manferdelli, J. L., "Natural Language Interfaces: Benefits, Requirements, State of the Art and Applications," *AI East*, Oct. 1987.

Schank, R. C., et al, "Inside Computer Understanding: Five Programs Plus Miniatures," 14:354–372, LEA, Publishers, Hillsdale, NJ (1981).

Hendrix, G., "The Lifer Manual: A Guide to Building Practical Natural Language Interfaces" (Technical Note 138); SRI International, Feb. 1977.

Hendrix, G., "Human Engineering for Applied Natural Language Processing" (Technical Note 139); SRI International, SRI Project 740D32 CTC, Feb 1977.

Kao, M., et al, "Providing Quality Responses with Natural Language Interfaces: The Null Value Problem," *IEEE* 14:7, 959–984, Jul., 1988.

Chapter 6, "Queries," *Building Access Z Applications*, 1995.

Chapter 8, "Using Query by Example," *Using Access 2 for Windows*, Sp. Ed.

Chapter 9, "Querying Your Data," *Inside Paradox 5 for Windows*, 1994.

Cinque, L., et al, "An Expert Visual Query System," *J. Vis. Lang. and Comp.*, 2:101–113 (1991).

Meng, W., et al. "A Theory of Translation From Relational Queries to Hierarchial Queries," *IEEE Transactions on Knowledge and Data Engineering*, 7:2, 228–245, Apr. 1995.

Jakobson, G., et al, "CALIDA: A System for Integrated Retrieval from Multiple Heterogeneous Databases," Proceedings of the 3rd Int'l Conf. on Data and Knowledge Bases: Improving Usability and Responsiveness, Jun. 28–30, Jerusalem, Israel.

| CUSTOMERS | | | | | | | |
|---|---|---|---|---|---|---|---|
| CUSTO-MER # | NAME | CITY | STATE | ZIP_CODE | SALES PERSON# | CREDIT_LIMIT | BALANCE |
| 1 | American Butcher Block | New Haven | CT | 16516 | 1 | 65000 | 85000 |
| 2 | Barn Door Furniture | New York | NY | 11019 | 1 | 50000 | 75000 |
| 3 | Bond Dinettes | Boston | MA | 22827 | 1 | 50000 | 500 |
| 4 | Carroll Cut-Rate | Los Angeles | CA | 23019 | 2 | 50000 | 0 |
| 5 | Porch and Patio | SanFrancisco | CA | 24082 | 3 | 65000 | 0 |
| 6 | Railroad Salvage | Bridgeport | CT | 26444 | 4 | 30000 | 750 |
| 7 | Sheffield Showrooms | Brooklyn | NY | 12018 | 5 | 50000 | 12050 |
| 8 | Spector Furniture | New Bedford | MA | 22451 | 5 | 50000 | 100 |
| 9 | Vista Designs | Stamford | CT | 26565 | 5 | 30000 | 4300 |
| 10 | Milford Furniture | Milford | CT | 26460 | 5 | 50000 | 0 |

FIG. 1A

| PRODUCTS | | | | | | | |
|---|---|---|---|---|---|---|---|
| PRO-DUCT# | NAME | GROUP_ID | TYPE_ID | ABC_CODE | PRICE | VENDOR # | ALT_VENDOR # |
| 1 | Executive Desk | 100 | 300 | A | 4995 | 1 | 2 |
| 2 | Colonial Bedroom Set | 100 | 600 | B | 3495 | 1 | |
| 3 | Children's Bedroom Set | 100 | 300 | C | 1195 | 2 | 3 |
| 4 | 5 Pc. Living Room Set | 100 | 500 | A | 4895 | 2 | 4 |
| 5 | Crib / Dresser Set | 100 | 400 | B | 985 | 3 | 3 |
| 6 | Bunk Bed | 100 | 400 | C | 795 | 3 | |
| 7 | 3 Pc. Dining Room Set | 100 | 500 | A | 3995 | 4 | |
| 8 | 4 Pc. Office Set | 200 | 300 | B | 2995 | 4 | 2 |
| 9 | Child's Desk | 100 | 400 | C | 899 | 5 | 1 |
| 10 | 4 Pc. Occasional Tables Set | 100 | 500 | B | 1299 | 5 | 1 |

FIG. 1B

| VENDORS | | |
|---|---|---|
| VENDOR# | NAME | PHONE |
| 1 | Chapel Hill Furniture | 412-748-2929 |
| 2 | Barnet Furniture | 314-345-6789 |
| 3 | Basset Inc. | 218-324-9288 |
| 4 | Seal Corporation | 509-929-2222 |
| 5 | Juvenile Warehouse | 413-345-5656 |

FIG. 1C

| SALESPEOPLE | | |
|---|---|---|
| SALESPERSON# | NAME | STATE |
| 1 | Paul Williams | NC |
| 2 | Bill Smith | KY |
| 3 | Wendy Jones | MA |
| 4 | Pam Johnson | CT |
| 5 | Sam Rogers | NY |

FIG. 1D

| CODES | |
|---|---|
| CODE_ID | CODE_TEXT |
| 100 | Home Furnishings |
| 200 | Office Furnishings |
| 300 | Desks |
| 400 | Juvenile Furnishings |
| 500 | Occasional Furnishings |

FIG. 1E

| ORDERS | | | | | | | |
|---|---|---|---|---|---|---|---|
| ORDER # | CUSTO-MER# | ORDER_DATE | ORDER_DOLLARS | FREIGHT_DOLLARS | SALES-PERSON # | SHIP_DATE | STATUS |
| 1000001 | 1 | 1992-1-5 | 36115 | 124 | 1 | 1992-1-15 | |
| 1000002 | 1 | 1992-4-5 | 7514 | 124 | 1 | 1992-10-24 | |
| 1000003 | 1 | 1992-7-5 | 39540 | 124 | 1 | 1992-7-15 | |
| 1000004 | 2 | 1992-2-15 | 47320 | 124 | 2 | 1992-2-24 | B |
| 1000005 | 2 | 1992-5-15 | 76195 | 124 | 2 | 1992-5-15 | B |
| 1000006 | 2 | 1992-8-15 | 6010 | 124 | 2 | 1992-9-15 | |
| 1000007 | 3 | 1992-3-25 | 3225 | 124 | 3 | 1992-3-27 | |
| 1000008 | 3 | 1992-6-25 | 12005 | 124 | 3 | 1992-7-2 | |
| 1000009 | 3 | 1992-9-25 | 36240 | 0 | 3 | 1992-10-15 | |
| 1000010 | 4 | 1992-2-5 | 8115 | 62 | 4 | 1992-2-15 | |
| 1000011 | 4 | 1992-5-15 | 20150 | 124 | 4 | 1992-5-24 | |
| 1000012 | 4 | 1992-8-25 | 25110 | 124 | 4 | 1992-8-29 | |
| 1000013 | 5 | 1992-3-4 | 72115 | 124 | 4 | 1992-3-22 | B |
| 1000014 | 5 | 1992-6-14 | 83550 | 124 | 4 | 1992-6-28 | |
| 1000015 | 5 | 1992-9-24 | 67015 | 124 | 4 | 1992-10-10 | |
| 1000016 | 6 | 1992-4-2 | 12105 | 124 | 1 | 1992-4-10 | |
| 1000017 | 6 | 1992-7-12 | 18105 | 124 | 1 | 1992-7-29 | |
| 1000018 | 6 | 1992-10-22 | 7350 | 124 | 1 | 1992-11-12 | |
| 1000019 | 6 | 1992-5-1 | 2660 | 124 | 1 | 1992-5-15 | |
| 1000020 | 6 | 1992-8-11 | 45250 | 124 | 1 | 1992-8-22 | |
| 1000021 | 7 | 1992-11-11 | 21500 | 124 | 2 | 1992-11-22 | |
| 1000022 | 7 | 1992-6-5 | 6150 | 62 | 2 | 1992-6-25 | |
| 1000023 | 7 | 1992-8-15 | 73595 | 124 | 2 | 1992-8-25 | |
| 1000024 | 9 | 1992-11-16 | 6100 | 124 | 3 | 1992-11-24 | |
| 1000025 | 9 | 1992-1-20 | 3250 | 124 | 3 | 1992-1-24 | |
| 1000026 | 9 | 1992-4-22 | 28190 | 124 | 3 | 1992-4-26 | |
| 1000027 | 9 | 1992-7-25 | 24250 | 124 | 3 | 1992-7-29 | |
| 1000028 | 10 | 1992-2-7 | 3620 | 124 | 5 | 1992-2-27 | B |
| 1000029 | 10 | 1992-5-17 | 107620 | 62 | 5 | 1992-5-26 | |

FIG. 1F

| LINE_ITEMS | | | | | |
|---|---|---|---|---|---|
| ORDER# | LINE # | PRODUCT# | QTY_ ORDERED | QTY_BACK- ORDERED | WAREHOUSE# |
| 1000001 | 1 | 1 | 2 | 5 | 1 |
| 1000001 | 2 | 2 | 0 | 3 | 1 |
| 1000002 | 1 | 3 | 2 | 6 | 1 |
| 1000003 | 1 | 4 | 0 | 8 | 1 |
| 1000004 | 1 | 5 | 0 | 2 | 1 |
| 1000004 | 2 | 6 | 3 | 3 | 1 |
| 1000004 | 3 | 7 | 0 | 5 | 2 |
| 1000004 | 4 | 8 | 2 | 7 | 2 |
| 1000004 | 5 | 9 | 0 | 2 | 2 |
| 1000005 | 1 | 10 | 2 | 8 | 2 |
| 1000005 | 2 | 1 | 2 | 3 | 1 |
| 1000005 | 3 | 2 | 9 | 9 | 1 |
| 1000005 | 4 | 3 | 4 | 4 | 1 |
| 1000005 | 5 | 4 | 0 | 3 | 1 |
| 1000006 | 1 | 5 | 0 | 6 | 1 |
| 1000007 | 1 | 6 | 0 | 4 | 1 |
| 1000008 | 1 | 7 | 0 | 3 | 2 |
| 1000009 | 1 | 8 | 0 | 12 | 2 |
| 1000010 | 1 | 9 | 0 | 9 | 2 |
| 1000011 | 1 | 10 | 0 | 15 | 2 |
| 1000012 | 1 | 1 | 0 | 5 | 1 |
| 1000013 | 1 | 2 | 0 | 9 | 1 |
| 1000013 | 2 | 3 | 0 | 7 | 1 |
| 1000013 | 3 | 4 | 4 | 4 | 1 |
| 1000013 | 4 | 5 | 5 | 5 | 1 |
| 1000013 | 5 | 6 | 7 | 7 | 1 |
| 1000014 | 1 | 7 | 0 | 2 | 2 |
| 1000014 | 2 | 8 | 0 | 6 | 2 |
| 1000014 | 3 | 9 | 0 | 1 | 1 |
| 1000014 | 4 | 10 | 0 | 8 | 1 |
| 1000014 | 5 | 1 | 0 | 9 | 2 |

FIG. 1G

| LINE_ITEMS | | | | | |
|---|---|---|---|---|---|
| ORDER# | LINE # | PRODUCT# | QTY_ORDERED | QTY_BACK-ORDERED | WAREHOUSE# |
| 1000015 | 1 | 2 | 0 | 4 | 2 |
| 1000015 | 2 | 3 | 0 | 7 | 2 |
| 1000015 | 3 | 4 | 0 | 4 | 2 |
| 1000015 | 4 | 5 | 0 | 7 | 1 |
| 1000015 | 5 | 6 | 0 | 9 | 1 |
| 1000016 | 1 | 7 | 0 | 3 | 1 |
| 1000017 | 1 | 8 | 0 | 6 | 2 |
| 1000018 | 1 | 9 | 0 | 8 | 2 |
| 1000019 | 1 | 10 | 0 | 2 | 1 |
| 1000020 | 1 | 1 | 0 | 9 | 1 |
| 1000021 | 1 | 2 | 0 | 6 | 1 |
| 1000022 | 1 | 3 | 0 | 5 | 2 |
| 1000023 | 1 | 4 | 0 | 15 | 2 |
| 1000024 | 1 | 5 | 0 | 6 | 1 |
| 1000025 | 1 | 6 | 0 | 4 | 1 |
| 1000026 | 1 | 7 | 0 | 7 | 1 |
| 1000027 | 1 | 8 | 0 | 8 | 1 |
| 1000028 | 1 | 9 | 0 | 4 | 2 |
| 1000029 | 1 | 10 | 0 | 8 | 2 |
| 1000029 | 2 | 1 | 0 | 5 | 1 |
| 1000029 | 3 | 2 | 0 | 9 | 1 |
| 1000029 | 4 | 3 | 0 | 6 | 1 |
| 1000029 | 5 | 4 | 0 | 4 | 1 |
| 1000029 | 6 | 5 | 0 | 9 | 1 |
| 1000029 | 7 | 6 | 0 | 3 | 2 |

Query Builder

Tables: CUSTOMER.DB

Fields:

Sort Order:

Conditions:

[OK] [Cancel] [Help]

Figure 2B

Query Builder

Tables: CUSTOMER.DB

Fields:
NAME
STATE
BALANCE

Sort Order:
NAME
STATE

Conditions:

[OK] [Cancel] [Help]

Edit Query

SQL
SELECT
    NAME
    STATE
    BALANCE
FROM
    CUSTOMER.DB
ORDER BY
    NAME
    STATE

[OK] [Cancel] [Help]

Figure 2C

Conditions

Conditions
CREDIT > 50000

| Connector | Field | Operator | Expression |
|---|---|---|---|
| AND | | > | |

[OK] [Cancel] [Help]

Figure 2D

Query Builder

Tables: CUSTOMER.DB

Fields: NAME, STATE, BALANCE

Sort Order: NAME, STATE

Conditions: CREDIT > 50000

[OK] [Cancel] [Help]

Figure 2E

Query1

| NAME | STATE | BALANCE |
|---|---|---|
| American Butcher Block | CT | 85000 |
| Porch And Patio | CA | 0 |

Figure 2F

Query Builder

Tables
CUSTOMER.DB

Fields
NAME
STATE
BALANCE

Sort Order
NAME
STATE

Conditions
CREDIT > 50000

Group By
SALESPERSON#

Having
SUM(BALANCE) > $80,000

OK  Cancel  Help

Figure 2G

Join Tables

| CUSTOMER.DB | | ORDER.DB |
|---|---|---|
| CUSTOMER# | <> | ORDER# |
| NAME | = | CUSTOMER# |
| CITY | >= | ORDER_DATE |
| STATE | <= | ORDER_DOLLARS |
| ZIP_CODE | > | FREIGHT_DOLLARS |
| SALESPERSON# | < | SALESPERSON# |
| CREDIT | | SHIP_DATE |
| BALANCE | | STATUS |

Figure 2H

```
                        Natural Language
   File  Questions  Report  Column/Table Configure Query Graph  Help
                        Natural Language
  : What were the 5 most common defects last month?
  What were the 5 defects that occurred the most in June, 1991
           Defect                          Count
           Contamination                   1213
           Damage in handling              516
           Surface finish                  423
           Bad soldering                   315
           Cracked board                   273
  : Show the SQL
  List the query.
  Query for: What were the 5 most common defects last month?
           select repair.def_cd, count(repair.mod_pn)
           from repair
           where repair.tstr_strt>='6/1/1991'
              and repair.tstr_strt<'7/1/1991'
           group by repair.def_cd
           order by 2 desc;
  :
```

Figure 3A

| | | | | |
|---|---|---|---|---|
| \multicolumn{5}{c}{Questions} |
| \multicolumn{5}{l}{File  Edit  Questions  Notes  Topics  Configure          Help} |
| \multicolumn{5}{c}{Questions} |
| Issue Question | | Edit Question | Show all Questions | Browse Questions |

Questions

| File Edit Questions Notes Topics Configure | Help |
|---|---|

| Issue Question | Edit Question | Show all Questions | Browse Questions |
|---|---|---|---|

| Which products are manufactured in Biloxi? |
|---|
| How many repairs did we perform last week? |
| List the top 5 defects last month. |
| Compare total defects this month to last month. |
| Which station performed the most repairs? |
| List all the sources of bolts. |
| Who supplies the best panels? |
| When was control plan z-557 updated? |
| How many units were produced after 6/1/91 |
| When is xz989 due for calibration? |
| Show the yields for each factory. |
| Pie chart the total units produced by each factory. |

Figure 3B

Computation

Select a column

○ Total      ○ Minimum
○ Average   ○ Maximum

[OK]
[Cancel]

Tables
CUSTOMERS
ORDERS
PRODUCTS

Columns   [Select]
THE COUNT OF CUSTOMERS
CREDIT LIMIT
CUSTOMER BALANCE
CUSTOMER CITY
CUSTOMER NAME
CUSTOMER NUMBER

| 9 | 8 | 7 |
|---|---|---|
| 6 | 5 | 4 |
| 3 | 2 | 1 |
| DEL | 0 | . |

+
-
*
/

( )

[Clear]

Computation:

Create "For..." Clause

"Show ..." Template
- ○ Show...  ● For ...  ○ Sorted By ...
- ☐ With % of Total ...

*Run Query*

[Clear] [Cancel]

Select an Item

- ○ Total    ○ Minimum
- ○ Average  ○ Maximum

[Select]
[Backup]
[Computation...]

Tables
- CUSTOMERS
- ORDERS
- PRODUCTS

Columns
- THE COUNT OF CUSTOMERS
- CREDIT LIMIT
- CUSTOMER BALANCE
- CUSTOMER CITY
- CUSTOMER NAME

Description

Customer Records.

INTERACTIVE DATABASE QUERY SYSTEM AND METHOD FOR PROHIBITING THE SELECTION OF SEMANTICALLY INCORRECT QUERY PARAMETERS

BACKGROUND OF THE INVENTION

The invention relates to a database querying tool, and specifically to a database querying tool which will guide a user to interactively create syntactically and semantically correct queries.

End user workstations are being physically connected to central databases at an ever increasing rate. However, to access the information contained in those databases, users must create queries using a standardized query language which in most instances is Structured Query Language (SQL). Most information system organizations consider it lo unproductive to try and teach their users SQL. As a result there is an increasing interest in tools that create SQL for the user using more intuitive methods of designating the information desired from the database. These tools are generally called SQL Generators.

Most SQL Generators on the market today appear to hide the complexities of SQL from the user. In reality, these tools accomplish this by severely limiting the range of information that can be retrieved. More importantly, these tools make it very easy for users to get incorrect results. These problems arise out of the reality that SQL is very difficult to learn and use. Existing technologies designed to shield users from the complexities of SQL can be grouped into three categories: point-and-shoot menus; natural language systems; and natural language menu systems. Each of these three categories of product/technology have architectural deficiencies that prevent them from truly shielding users from the complexities of SQL.

Limitations of SOL As An End User Query Language

SQL is, on the whole, very complex. Some information requirements can be satisfied by very simple SQL statements. For example, to produce from a database a list of customer names and phones for New York customers sorted by zip code, the following SQL statement could be used:

```
(1)     SELECT NAME, PHONE
        FROM CUSTOMERS
        WHERE STATE = 'NY'
        ORDER BY ZIP_CODE
```

In this example, the SELECT command defines which fields to use, the WHERE command defines a condition by which database records are selected, and ORDER BY keywords define how the output should be sorted. The FROM keyword defines in which tables the fields are located. Unfortunately, only a relatively small percentage of information required can be satisfied with such simple SQL Most information needs, even very simple queries, require complex SQL queries. For example, the SQL statement required to generate a list of orders that have more than two products on backorder, is:

```
(2)     SELECT T1.ORDER#, T1.ORDER_DATE, T1.ORDER_DOLLARS
        FROM ORDERS T1
        WHERE 2 <(
            SELECT COUNT (*)
            FROM PRODUCTS T2, LINE_ITEMS T3
            WHERE T3.QTY_BACKORDERED > 0
                AND T2.PRODUCT# = T3.PRODUCT#
                AND T1.ORDER# = T3.ORDER#)
```

This SQL statement contains two SELECT clauses, one nested with the other. For a user to know that this information requirement needs an SQL query involving this type of nesting (known as a correlated subquery) implies some understanding by the user of the relational calculus. However, except for mathematicians and people in the computer field, few users have this skill. The following are some examples of database queries that require more complex SQL constructs:

GROUP BY: Approximately 75% of all ad hoc queries require a GROUP BY statement in the SQL. Examples include:

Show total sales by division.

Show January sales of bedroom sets to Milford Furniture.

Subqueries: The following are examples of database queries that require subquery constructs which appear as nested WHERE clauses in SQL:

Show customers that have children under age 10 and do not have a college fund.

Show orders that have more than 2 line items on backorder.

HAVING: The following are examples of database queries that require the HAVING construct:

Show ytd expenses by employee for divisions that have total ytd expenses over 15,000,000.

Show the name and manager of salesmen that have total outstanding receivable of more than $100,000.

CREATE VIEW: The following are examples of database queries that require the
CREATE VIEW syntax:

Show ytd sales by customer with percent of total.

What percent of my salesmen have total ytd sales under $25,000?

UNION: The following are examples of database queries that require the UNION construct:

Show ytd sales for Connecticut salesmen compared to New York salesmen sorted by product name.

Show Q1 sales compared to last year Q1 sales sorted by salesman.

Thus, common information needs require complex SQL that is likely to be far beyond the understanding of the business people that need this information.

A greater problem than the complexity of SQL is that syntactically correct queries often produce wrong answers. SQL is a context-free language, one that can be fully described by a backus normal form (BNF), or context-free, grammar. However, learning the syntax of the language is not sufficient because many syntactically correct SQL statements produce semantically incorrect answers. This problem is illustrated by some examples using the database that has the tables shown in FIGS. 1A–G. If the user queries the database with the following SQL query:

```
(3)   SELECT CUSTOMERS.NAME, SUM(ORDERS.ORDER_DOLLARS),
          SUM(LINE_ITEMS.QTY_ORDERED)
      FROM CUSTOMERS, ORDERS, LINE_ITEMS
      WHERE CUSTOMERS.CUSTOMER# = ORDERS.CUSTOMER#
          AND ORDERS.ORDER# = LINE_ITEMS.ORDER#
```

The following results are produced:

| | NAME | SUM(ORDER_DOLLARS) | SUM(QTY_ORDERED) |
|---|---|---|---|
| 1 | American Butcher Block | 119284 | 22 |
| 2 | Barn Door Furniture | 623585 | 52 |
| 3 | Bond Dinettes | 51470 | 19 |
| 4 | Carroll Cut-Rate | 53375 | 29 |
| 5 | Milford Furniture | 756960 | 48 |
| 6 | Porch and Patio | 1113400 | 89 |
| 7 | Railroad Salvage | 85470 | 28 |
| 8 | Sheffield Showrooms | 101245 | 26 |
| 9 | Vista Designs | 61790 | 25 |

The second column of this report appears to show the total order amount for each customer. However, the numbers are incorrect. In contrast, the following query

```
(4)   SELECT CUSTOMERS.NAME, SUM(ORDERS.ORDER_DOLLARS)
      FROM CUSTOMERS, ORDERS
      WHERE CUSTOMERS.CUSTOMER# = ORDERS.CUSTOMER#
``` produces the correct result:

| | NAME | SUM(ORDER_DOLLARS) |
|---|---|---|
| 1 | American Butcher Block | 83169 |
| 2 | Barn Door Furniture | 129525 |
| 3 | Bond Dinettes | 51470 |
| 4 | Carroll Cut-Rate | 53375 |
| 5 | Milford Furniture | 111240 |
| 6 | Porch and Patio | 222680 |
| 7 | Railroad Salvage | 85470 |
| 8 | Sheffield Showrooms | 101245 |
| 9 | Vista Designs | 61790 |

Both SQL queries are syntactically correct, but only the second produces correct numbers for the total order dollars. The problem arises from the fact that before performing the selection and totaling functions, the SQL processor performs a cross-product join on all the tables in the query. In the first query above, three tables are used: Customer (a list of customers with customer data): Order (a list of orders with dollar amounts); and Line_Item (a list of the individual line items on the orders). Since the Order table has the total dollars and there are multiple line items for each order, the joining scheme of the SQL processor creates a separate record containing the total dollars for an order for each instance of a line item. When totaled by Customer, this can produce an incorrect result. When the Line_Item table is not included in the query, the proper result is obtained. Unless the users understand the manner in which the database is designed and the way in which SQL performs its query operations, they cannot be certain that this type of error in the result will or will not occur. Whenever a query may utilize more then two tables, this type of error is possible.

Most information systems users would be reluctant to use a database query tool that could produce two different sets of results for what to them is the same information requirement (i.e. total order dollars for each customer). Virtually every known database query tool suffers from this shortcoming.

A more formal statement of this problem is that the set of acceptable SQL statements for an information system is much smaller than the set of sentences in SQL. This smaller set of sentences is almost certainly not definable as a context-tree grammar.

Point-And-Shoot Query Tools

Most SQL generator products are "point-and-shoot" query tools. This class of products eliminates the need for users to enter SQL statements directly by offering users a series of point-and-shoot menu choices. In response to the user choices, point-and-shoot query tools create SQL statements, execute them, and present the results to the user, appearing to hide the complexities of SQL from the user. Examples of this class of product include Microsoft's Access, Gupta's Quest, Borland's Paradox, and Oracle's Data Query.

Although such products shield users from SQL syntax, they either limit users to simple SQL queries or require users to understand the theory behind complex SQL constructs. Moreover, because they target the context-free SQL grammar discussed above, it is easy and common for users to get incorrect answers. A point-and-shoot query tool is illustrated below with several examples showing a generic interface similar to several popular query tools representative of this genre. The screen of FIG. 2A appears after the user has chosen the customer table of FIG. 1A out of a pick list. This screen shows the table chosen and three other boxes, one for each of the SELECT, WHERE, and ORDER BY clauses of the SQL statement. If the user selects either the "Fields" box or the "Sort Order" box, a list of the fields in the customer table appears. The user makes choices to fill in the "Fields" and "Sort Order" boxes. In this example, the user chooses to display the NAME. STATE, and BALANCE fields, and to sort by NAME and STATE. This produces the screen of FIG. 2B.

At any time, the user can choose to view the SQL statement that is being created as shown in FIG. 2C. There is a one-to-one correspondence between user choices and the SQL being generated. To fill in the WHERE clause of the SQL statement being compiled, the user chooses the "Conditions" box and fills in the dialog box of FIG. 2D to enter a condition. This produces the completed query design shown in FIG. 2E. The user then chooses the "OK" button to run the query and see the results shown in FIG. 2F.

For queries that involve only a simple SELECT, WHERE, and ORDERBY statement for a single table, a user can readily create and execute SQL statements without knowing SQL or even viewing the SQL that is created.

Unfortunately, only a small proportion of user queries are this simple. Most database queries involve more complex SQL. To illustrate this point, consider a user who wishes to see the same information as in the above example, but to limit the data retrieved to customers of salespersons with total outstanding balance of all the salesperson's customers greater then $80,000. If the user realizes that this query requires two additional SQL clauses (a GROUP BY clause and a HAVING clause) the query (shown in FIG. 2G) can be readily constructed. However, few users are sufficiently familiar with SQL to do so.

Most point-and-shoot query tools cannot handle other complex SQL constructs such as subqueries. CREATE VIEW and UNION. They offer no way (other than entering SQL statements directly) for the user to create these other constructs. Those products that do offer a way to generate other complex constructs require the user to press a "Subquery" or "UNION" or "CREATE VIEW" button. Of course, only users familiar enough with the relational calculus to know how to break a query up into a subquery or use another complex SQL construct would know enough to press the right buttons.

Additional complexity is introduced when data must be retrieved from more than one table. As shown in FIG. 2H, the user may be required to specify how to join the tables together. The typical user query will involve at least three tables. Problems that can arise in specifying joins include:

the columns used to join tables may not have the same name;

the appropriate join between two tables may involve multiple columns;

there may be alternative ways of joining two tables; and there may not be a way of directly joining two tables, thereby requiring joins through other tables not otherwise used in the query.

In summary, point-and-shoot query tools shield users from syntactic errors, but still require users to understand SQL theory. The other critical limitation of point-and-shoot menu products is that they target the context-free SQL language discussed above. A user seeking total order dollars could as easily generate incorrect SQL statement (3) as correct SQL statement (4) above. Thus, these products generate syntactically correct SQL, but not necessarily semantically correct SQL. Only a user that understands the relational calculus can be assured of making choices that generate both syntactically correct and semantically correct SQL. However, most information system users do not know relational calculus. Moreover, when queries require joins, there are numerous way of making errors that also produce results that have the correct format, but the wrong answer.

Natural Language Query Tools

Natural language products use a different approach to shielding users from the complexities of SQL. Natural language products allow a user to enter a request for information in conversational English or some other natural language. The natural language product uses one mechanism to deduce the meaning of the input, a second mechanism to locate database elements that correspond to the meaning of the input, and a third mechanism to generate SQL.

Examples of natural language products include Natural Language from Natural Language Inc. and EasyTalk from Intelligent Business Systems (described in U.S. Pat. No. 5,197,005 to Shwartz et al.).

FIG. 3A shows a sample screen for a natural language query system which shows a user query, the answer, another query requesting the SQL, and the SQL.

The sequence of interaction is:

(1) The user types in a free-form English query <"What were the 5 most common defects last month?").

(2) The software paraphrases the query so that the user can verify its correctness "What were the 5 defects that occurred the most in June, 1991?").

(3) If there are spelling errors or if the user query contains ambiguities, the software interacts with the user to clarify the query. (not needed in above example).

(4) The software displays the results.

The attraction of a natural language query tool is that users can express their requests for information in their own words. However, they suffer from several shortcomings. First, they only answer correctly a fraction of the queries a user enters. In some cases, the paraphrase is sufficient to help the user reformulate the query; however, users can become frustrated seeking a formulation that the system will accept. Second, they are difficult to install, often requiring months of effort per application and often requiring consulting services from the natural language vendor. One of the biggest installation barriers is that a huge number of synonyms and other linguistic constructs must be entered in order to achieve anything close to free-form input.

As a compromise, many natural language vendors recommend that, during installation, specific queries are coded and made available to users via question lists. For example. FIG. 3B shows a simple screen containing a list of predefined queries. Users can choose to rnn queries directly from the list or make minor modifications to the query before running it. Of course, the more they change a query, the more likely it is that the natural language system will not understand the query.

To illustrate the operation natural language products, the architecture of the natural language system described in Shwartz, et al. is used as an example. The system architecture is shown in FIG. 4. The Meaning Representation is the focus of Shwartz et al. The Meaning Representation of a query is designed to hold the meaning of the user query, independent of the words (and language) used to phrase the query and independent of the structure of the database.

The same Meaning Representation should be produced whether the user says "Show total ytd sales for each customer?", "What were the total sales to each of my client's this year to date?". or "Montrez les vendes . . . " (French). Moreover, the same Meaning Representation should be produced whether: (1) there is a field that holds ytd sales in a customer table in the database; (2) each individual order must be searched, sorted, and totaled to compute the ytd sales for each customer: or (3) ytd sales by customer is simply not available in the database.

The primary rationale for this architecture is that it provides a many-to-one mapping of alternative user queries onto a single canonical form. Many fewer inference rules are then needed to process the canonical form than would be needed to process user queries at the lexical level. This topic is addressed in more detail in Shwartz, "Applied Natural Language", 1987.

The NLI (Natural Language Interface) is responsible for converting the natural language query into a Meaning Representation. The Query Analyzer itself contains processes for syntactic and semantic analysis of the query, spelling correction, pronominal reference, ellipsis resolution, ambiguity resolution, processing of nominal data, resolution of date and time references, the ability to engage the user in clarification dialogues and numerous other functions. Once an initial Meaning Representation is produced, the Context Expert System analyzes it and fills in pronominal referents, intersentential referents, and resolves other elliptical elements of the query. See S. Shwartz, for a more detailed discussion of this topic.

The Meaning Representation for the query "Show ytd sales dollars sorted by salesrep and customer" would be:

SALES: TIME (YTD), DOLLARS, TOTAL

SALESMAN: SORT(1)

CUSTOMER: SORT(2)

Again, this meaning representation is independent of the actual database structure. The Database Expert takes this meaning representation, analyzes the actual database structure, locates the database elements that best match the meaning representation, and creates a Retrieval Specification. For a database that has a table, CUSTOMERS, that contains a column holding the total ytd sales dollars, YTD_SALES$, the Retrieval Specification would be:

CUSTOMER.YTD_SALES $:

SALESMAN.NAME:SORT(1)

CUSTOMERS.NAME:SORT(2)

The Retrieval Specification would be different if the YTD_SALES$ column was in a different table or if the figure had to be computed from the detailed order records.

The functions of the NLI (and Context Expert) and DBES are necessary solely because free-form, as opposed to formal, language input is allowed. If a formal, context-free command language was used rather than free-form natural language, none of the above processing would be required. The Retrieval Specification is equivalent to a formal, context-free command language.

The Navigator uses a standard graph theory algorithm to find the minimal spanning set among the tables referred to in the Retrieval Specification. This defines the join path for the tables. The MQL Generator then constructs a query in a DBMS-independent query language called MQL. The SQL Generator module then translates MQL into the DBMS-specific SQL. All of the expertise required to ensure that only syntactically and semantically valid SQL is produced is necessarily part of the MQL Generator module. It is the responsibility of this module to reject any Retrieval Specifications for which the system could not generate syntactically and semantically valid SQL.

Natural Language Menu Systems

A Natural Language Menu System is a cross between a point-and-shoot query tool and a natural language query tool. A natural language menu system pairs a menu interface with a particular type of natural language processor. Rather than allowing users to input free-form natural language, a context-free grammar is created that defines a formal query language. Rather than inputting queries through a command interface, however, users generate queries in this formal language one word at a time. The grammar is used to determine all possible first words in the sentence, the user chooses a word from the generated list, and the grammar is then used to generate all possible next words in the sentence. Processing continues until a complete sentence is generated.

A natural language menu system will provide a means of ensuring that the user only generates syntactically valid sentences in the sublanguage. However, it can only guarantee that these sentences will be semantically valid for the class of sublanguages in which all sentences are semantically valid. Another difficulty with this class of tool is that it is computationally inadequate for database query. The computational demands of the necessarily recursive algorithm required to run the grammar are immense. Moreover, if the grammar is sufficient to support subqueries, the grammar would probably have to be a cyclic grammar, adding to the computational burden. Finally, the notion of restricting users to a linear sequence of choices is incompatible with modern graphical user interface conventions. That is, users of this type of interface for database query would object to being forced to start with the first word of a query and continue sequentially until the last word of a query. They need to be able to add words in the middle of a query without having to back up and need to be able to enter clauses in different orders.

SUMMARY OF THE INVENTION

The drawbacks of the prior art are overcome by the system and method of the present invention, which hides the complexity of SQL from the user without limiting the range of information that can be retrieved. Most importantly, incorrect results are avoided In accordance with the principles of the invention, a Query Assistant is provided that permits the user to enter only queries that are both syntactically and semantically valid (and that can be processed by the SQL Generator to produce semantically valid SQL). The user is never asked to rephrase a query entered through the Query Assistant. Through the use of dialog boxes, a user enters a query in an intermediate English-like language which is i) easily understood by the user. A Query Expert system monitors the query as it is being built, and using information about the structure of the database, it prevents the user from building semantically incorrect queries by disallowing choices in the dialog boxes which would create incorrect queries. An SQL Generator is also provided which uses a set of transformations and pattern substitutions to convert the intermediate language into a syntactically and semantically correct SQL query.

The intermediate language can represent complex SQL queries while at the same time being easy to understand. The intermediate language is also designed to be easily converted into SQL queries. In addition to the Query Assistant and the SQL Generator an administrative facility is provided which allows an administrator to add a conceptual layer to the underlying database making it easier for the user to query the database. This conceptual layer may contain alternate names for columns and tables, paths specifying standard and complex joins, definitions for virtual tables and columns, and limitations on user access.

BRIEF DESCRIPTION OF THE DRAWINGS

FIGS. 1A to 1G are tables of a sample database used in the examples in the specification.

FIGS. 2A to 2H are typical screen displays for a point-and-shoot query tool.

FIG. 3A is a typical screen display for a natural language query tool.

FIG. 3B is a typical screen display for a natural language database query tool with predefined queries.

FIGS. 10A to 10G are depictions of dialog boxes used to interact with the user to build a query using the Query Assistant.

DETAILED DESCRIPTION

I. OVERVIEW

Figure 4:
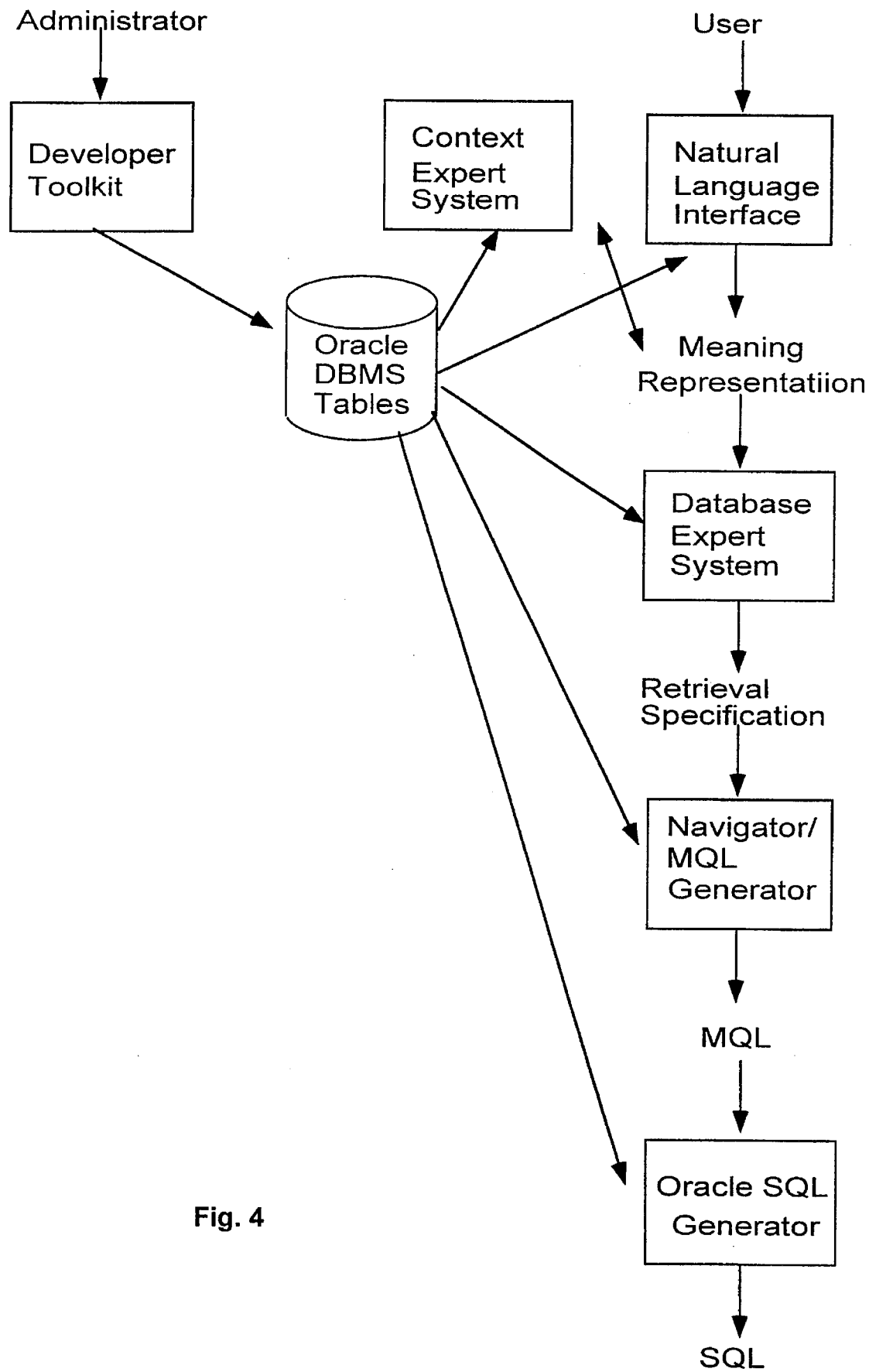
FIG. 4 is a block diagram of the high level architecture of a natural language query tool.
Figure 5:
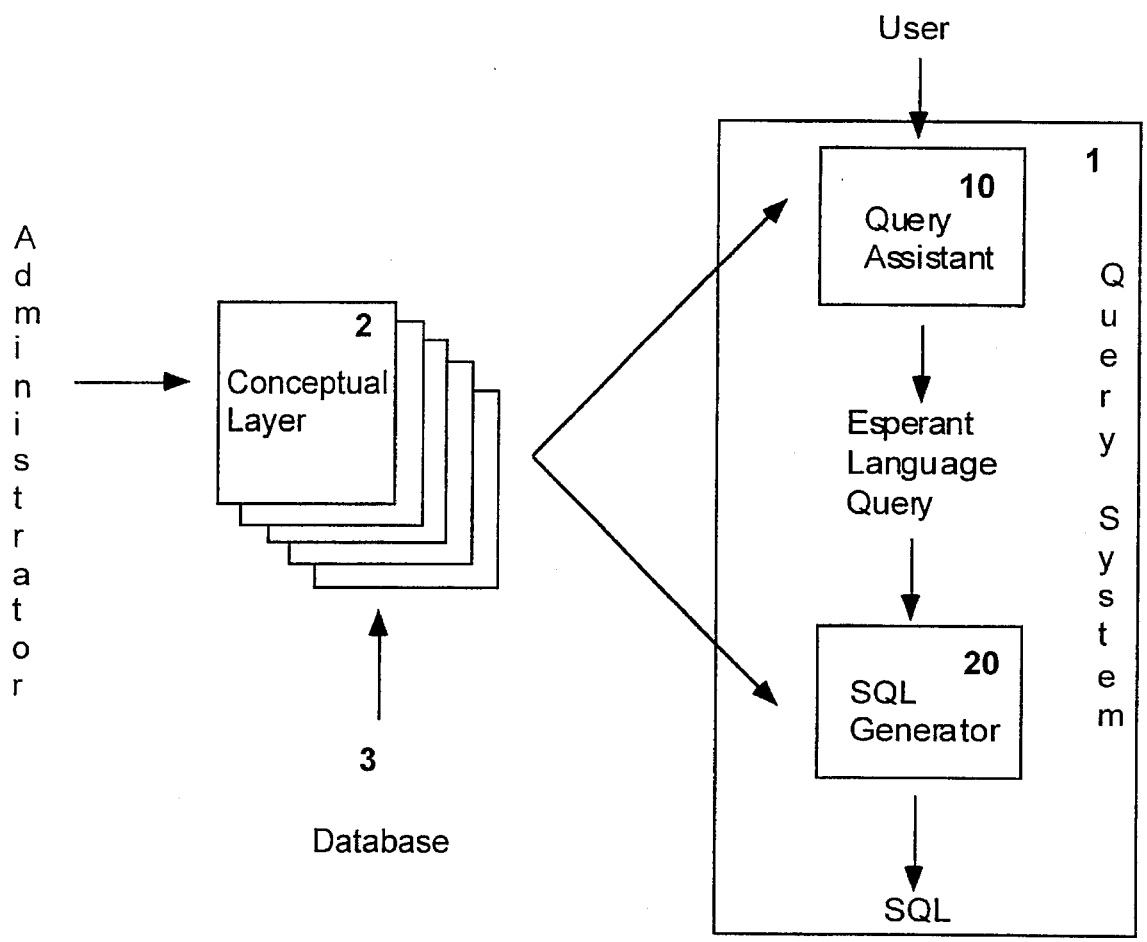
FIG. 5 is a block diagram of the high level architecture of the invention.

FIG. 5 shows a high level block diagram of an intelligent query system that embodies the principles of the invention. It is composed of two parts, the Query System 1 and Conceptual Layer 2. Conceptual Layer 2 is composed of information derived from database 3, including table and column information, and information entered by an administrator to provide more intuitive access to the user. Query System 1 uses the information from Conceptual Layer 2 as well as general knowledge about SQL and database querying to limit the user in building queries to only those queries which will produce semantically correct results.

Query System I is further composed of two main components: Query Assistant 10 and the SQL Generator 20. Users create queries using the menu-based Query Assistant 10 which generates statements in an intermediate query language that take the form of easy to understand sentences. SQL Generator 20 transforms the intermediate language into a target language (in the illustrated embodiment, SQL). To fulfill the requirement that a user never be asked to rephrase (or reconstruct) a query, the expertise concerning what is and what is not a valid SQL query is placed in Query Assistant 10.

SQL Generator 20 does not contain this expertise. Although users can pose queries directly to SQL Generator 20, there is no assurance that semantically valid SQL will be produced. It is logically possible to put some of this expertise into SQL Generator 20. However, to assure users that only valid SQL would be generated would require natural language capabilities not presently available.

II. CONCEPTUAL LAYER

A database may be composed of one or more tables each of which has one or more columns, and one or more rows. For example:

| Name | State | Zip |
|---|---|---|
| John | VA | 22204 |
| Mary | DC | 20013 |
| Pat | MD | 24312 |

In this small example, there is one table containing three columns, and three rows. The top row is the column names and is not considered a row in the database table. The term 'row' is interchangeable with the term 'record' also often used in database applications, and 'column' is interchangeable with the term 'field'. The primary distinction between the two sets of terms is that row and column are often used when the data is viewed in a list or spreadsheet table style view, and the terms field and record are used when the data is viewed one record at a time in a form style view.

A database may have more then one table. To this simple example, another table can be added called Purchases which lists purchases made by each Person.

| Name | Product | Quantity |
|---|---|---|
| John | apple | 6 |
| John | orange | 4 |
| Mary | kiwi | 2 |
| Pat | orange | 12 |
| Pat | kiwi | 5 |
| Pat | mango | 10 |

Stored along with a database is some structure information about the tables contained within the database. This includes the name of the tables, if there are more then one, the names of the columns of the tables, and the structure of the data stored in the columns. In the above example, the first table is titled (for purposes of this example) "Person" and the second table "Purchases." In the Person table there are three columns: "Name", containing alphanumeric data; "State" containing two characters of alphanumeric data: and "Zip", which may be stored as five characters of alphanumeric data or as numeric data. In the Purchases table there are also three columns: "Name", containing alphanumeric data; Product, containing alphanumeric data: and Quantity, containing numeric data.

Also, stored along with the database are the primary keys for each of the tables. In most database systems each row must be uniquely identifiable. One or more columns together create the primary key which when the contents of those columns are combined uniquely identity each row in the table. In the Person table above, the column Name is unique in each row and Name could be the primary key column. However, in the Purchases table, "Name" does not uniquely identify, each row since there are multiple Johns and Pats. In that table, both the "Name" and "Product" columns together uniquely identify each row and together form the primary key.

In the above example, there is an implied relationship between the two tables based on the common column title "Name". To determine how many oranges Virginians buy, a user could look in the Person table and find that John is the only Virginian and then go to the Purchases table to find that he bought four oranges. Some database managers explicitly store information about these relationships, including situations where the relationship is between two columns with different names.

The example above is very simple, and a user could readily understand what information the database held and how it was related. However, real world problems are not that simple. Though still rather simplistic compared to the complexity of many real world problems, the example database represented in FIGS. 1A–G begins to show how difficult it might be for a user to understand what is contained in the database and how to draft a meaningful query. This is particularly difficult if the real meaning of the database is contrary to the naming conventions used when building it. For example, the Customer Table of FIG. 1A is not related directly to the Product Table of FIG. 1B even though they both have columns entitled NAME. However, they are related via the path CUSTOMER=>ORDER=>LINE_ITEM<=PRODUCT (i.e. a customer has orders, an order has line_items, and each line_item has a product).

To shield the user from the complexity of the underlying database, a knowledgeable administrator may define a conceptual layer, which in addition to the basic database structure of table names and keys, and column names and types, also may include: foreign keys, name substitutions, table and column descriptions, hidden tables and columns, virtual tables, virtual columns, join path definitions and non-equijoins.

All of the forms of information that make up the conceptual layer can be stored alongside the database as delimited items in simple text files, in a database structure of their own, in a more compact compiled format, or other similar type of information storage. When a database is specified to be queried Query Assistant 1 has access to the basic structure of the database, which the database manager provides, to aid the user in formulating semantically correct queries. Optionally the user may choose to include the extended set of conceptual information which Query Assistant 1 can then use to provide a more intuitive query tool for the end user.

The conceptual layer information is stored internally in a set of symbol tables during operation. Query Assistant 10 uses this information to provide the user a set of choices conforming to the environment specified by the Administrator, and SQL Generator 20 uses the information, through a series of transformations, to generate the SQL query.

1. Foreign keys

A table's foreign keys define how they relate to other tables. Two tables are joined by mapping the foreign key of one table to the primary key of the second table. A foreign key is defined by the columns within the first table that make up the foreign key, and the name of the second table which can join with the first table by matching its primary key with the first table's foreign key.

In the example above, the Purchases table with the foreign key "Name" can join the Person table with the primary key "Name."

|             | Purchases |           | Person |             |
|-------------|-----------|-----------|--------|-------------|
| foreign key | Name      | <-------  | Name   | primary key |
|             | Product   |           | State  |             |
|             | Quantity  |           | Zip    |             |

If the two tables are joined based on their foreign and primary keys, the following new table is created:

| Name | State | Zip   | Product | Quantity |
|------|-------|-------|---------|----------|
| John | VA    | 22204 | apple   | 6        |
| John | VA    | 22204 | orange  | 4        |
| Mary | DC    | 20013 | kiwi    | 2        |
| Pat  | DC    | 20013 | orange  | 12       |
| Pat  | MD    | 24312 | kiwi    | 5        |
| Pat  | MD    | 24312 | mango   | 10       |

Figure 6:
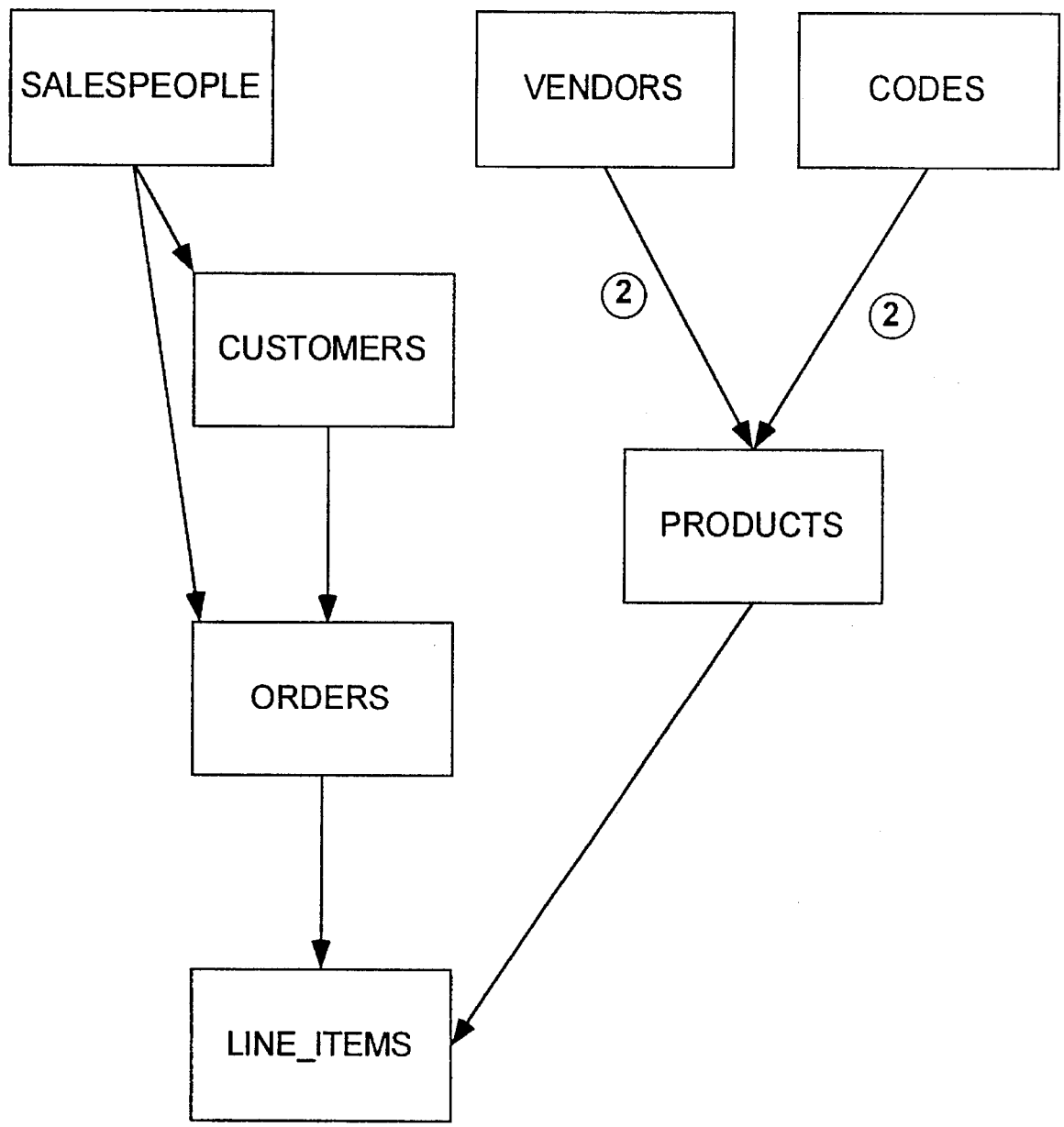
FIG. 6 is a graphic depiction of the tables in FIGS. 1A–1G and their relationships.

Rows from each of the two tables with the same value in their respective "Name" column were combined to create this new table. This is referred to as a One-to-Many relationship. For every one Person row there can be many Purchases rows. A relationship can also be One-to-One, which indicates that for every row in one table, there can be only one related row in another table. Both One-to-Many and One-to-One relationships may be optional or required. If optional, then there may not be a related row in a second table. In the illustrated embodiment, along with the foreign key in the conceptual layer an administrator may designate which of these four types of relationships (i.e. one-to-many, one-to-many optional, one-to-one, one-to-one optional) exists between the tables joined by the foreign key. In some database management systems, it is possible for a table to have multiple primary keys, in which case, the administrator must also designate to which primary key the foreign key is to be joined. FIG. 6 is a graphical representation of the relationships between the tables in FIGS. 1A–1G. Each line represents a relationship between two tables and an arrow at the end of the line indicates a one-to-many optional relationship. The end with the arrow is the "many" end of the relationship. For example, between the SALESPEOPLE and CUSTOMERS tables there is a one-to-many relationship with multiple customers handled by each salesperson. Using the example tables of FIGS. 1A–G and the relationships illustrated in FIG. 6 a definition in the conceptual layer for the foreign keys would be:

| Table      | Foreign Key  | Second Table | Relationship Type | Primary Key |
|------------|--------------|--------------|-------------------|-------------|
| CUSTOMERS  | SALESPERSON# | SALESPEOPLE  | 1-to-many opt.    | 1           |
| LINE_ITEMS | ORDER#       | ORDERS       | 1-to-many opt.    | 1           |
| LINE_ITEMS | PRODUCT#     | PRODUCTS     | 1-to-many opt.    | 1           |
| ORDERS     | CUSTOMER#    | CUSTOMERS    | 1-to-many opt.    | 1           |
| ORDERS     | SALESPERSON# | SALESPEOPLE  | 1-to-many opt.    | 1           |
| PRODUCTS   | GROUP_ID     | CODES        | 1-to-many opt.    | 1           |
| PRODUCTS   | TYPE_ID      | CODES        | 1-to-many opt.    | 1           |
| PRODUCTS   | ALT-VENDOR#  | VENDORS      | 1-to-many opt.    | 1           |
| PRODUCTS   | VENDOR#      | VENDORS      | 1-to-many opt.    | 1           |

The above chart represents the foreign key data which may be present in the conceptual layer. The chart is described by way of an example. According to the first row below the headings of the chart, there is a table CUSTOMERS with a foreign key defined by the column SALESPERSON#. This foreign key relates to the first primary key (note the 1 in the primary key column) of the SALESPEOPLE table by a one-to-many optional relationship. In other words, for every row in the SALESPEOPLE table there are zero or more related rows in the CUSTOMERS table according to SALESPERSON#.

The (2) next to the lines between CODES and PRODUCTS and VENDORS and PRODUCTS in FIG. 6 indicates that there are actually two one-to-many relationships between those tables. This can be seen in the foreign key chart above. There are two sets of foreign keys linking PRODUCTS to VENDORS and PRODUCTS to CODES.

2. Name substitution

Name substitution is the process by which a table's or columns name as defined in the database structure is substituted with another more intuitive name for presenting to the user. This is particularly useful when dealing with a database management system which only provides limited naming capabilities (i.e. only one word). This process serves two primary purposes. First it allows an administrator to make the information available to the user in a given database more readily understandable, and second, it can be used to distinguish columns from different tables which have the same name, but are not related (i.e. column "Name" in the CUSTOMERS table (FIG. 1A) and column "Name" in the PRODUCTS table (FIG. 1B). In addition, it is possible to provide plural and singular names for tables.

For example, using the table in FIG. 1A it is possible to define the singular and plural names for the table as CUSTOMER and CUSTOMERS, and to rename the fields to provide more guidance to the user and distinguish conflicts as follows:

| Column | New Name |
| --- | --- |
| CUSTOMER# | Customer Number |
| NAME | Customer Name |
| CITY | Customer City |
| STATE | Customer State |
| ZIP CODE | Customer Zip Code |
| SALESPERSON# | Salesperson Number |
| CREDIT_LIMIT | Credit Limit |
| BALANCE | Customer Balance |

3. Table and column descriptions

Descriptions of the various tables and columns can be included in the conceptual layer to provide better understanding for the user. For example, The CUSTOMER table may have an associated description of "Records containing address and credit information about our customers." Then when the user highlights or otherwise selects the CUSTOMER table while building a query, the description will appear on a status line of the user interlace or something similar. The same type of information can be stored for each of the columns which display when the columns are highlighted or otherwise selected for possible use in a query.

4. Hidden tables and columns

In the design of a database, it is often necessary to add columns that are important in relating the database tables but that are not used by the end user who will be forming queries on the database. For example, the SALESPERSON# column in the tables of FIGS. 1A, 1D, and 1E are not important to the end user, who need only know that Paul Williams is the salesperson for American Butcher Block and Barn Door Furniture. The end user need not know that his internal number for use in easily relating the tables is 1. Accordingly, as part of the conceptual layer, an administrator can hide certain columns so that the user cannot attempt to display them or use them in formulating a query. When a column is hidden, it can still be used to join with another table. This same techniques can be used to prevent end users from displaying private or protected data, and to shield the user from the details of the database which might be confusing and unnecessary.

In some cases, there are tables which are used to link other tables together or are unimportant to the end user. Therefore, as part of the conceptual layer, an administrator can also hide certain tables so that the user cannot attempt to display them or use them in formulating a query. A hidden table, however, can still be used by the query system to perform the actual query—it is just a layer of detail hidden from the end user. In addition, as described in more detail below, when virtual column and table techniques are used, columns may be included, for display to the end user, as elements of other tables. By hiding the original columns and/or tables, the administrator can, in effect, move a column from one table to another.

When designating elements that an end user can include in generating a semantically correct query, the Query Assistant will not designate the hidden tables and columns.

5. Virtual tables

Virtual tables are constructs that appear to the user as separate database tables. They are defined by the Administrator as a subset of an existing database table limited to rows that meet a specific condition. Initially, the virtual table has all the fields within the actual table upon which it is based, but it only contains a subset of the records. For example, the Administrator could define the virtual table BACKORDERS which includes all the records from the ORDERS table where the Status field contains the character "B". Then, when a user queries the BACKORDERS table, the user would only have access to those orders with backorder status.

The Administrator defines the virtual table according to a condition clause of the target language (in this case, SQL). In the above example, the table BACKORDERS would be defined as "ORDERS WHERE ORDERS.STATUS='B'". In this way, the SQL generation portion of the virtual table is accomplished by a simple text replacement. Similarly, the condition could be stored in an internal representation equivalent to the SQL or other target language condition.

It is possible to define a virtual table without the condition clause. In that case, a duplicate of the table on which it is based is used. However, the Administrator can hide columns and add virtual columns to the virtual table to give it distinct characteristics from the table upon which it is based. For example, a single table could be split in two for use by the end user by creating a virtual table based on the original and then hiding half of the columns in the original table, and half of the columns in the virtual table.

6. Virtual columns

The conceptual layer may also contain definitions for virtual columns. Virtual columns are new columns which appear to the user to be actual columns of a table. Instead of containing data, the values they contain are computed when a query is executed. It is possible to add fields which perform calculations or which add columns from other tables. There are six primary uses for virtual columns:

(1) Moving/copying items from one table to another. Often due to various database design factors, there are more tables in the physical database then in the user's conceptual model. In the example in FIGS. 1A–1G, an end user might not consider orders as being multiple rows in multiple tables as is required with the LINE-ITEM, ORDER distinction of the example. The Administrator can specify in the conceptual layer that the user should see the field of LINE_ITEM (i.e. product, qty_ordered, qty_backordered, warehouse, etc.) as being part of the order table. Columns can be moved from one table to another with only one limitation that a primary key/foreign key relationship exist between the table the column is being moved from and the table the column is being moved to. These relationships are indicated in FIG. 6 as the lines with the arrows.

(2) Creating a virtual column defined by a computation. Virtual columns can be created by an administrator which are computations on existing columns in a table. For example, we could add a TURNAROUND column to the ORDERS table of FIG. 1F defined as "SHIP_DATE—ORDER_DATE". This would allow a user to easily create a query which asked to show what the turnaround time was for orders without having to actually specify the calculation in the query.

(3) Creating a virtual column defined using DBMS specific functions. The target language of the Data Base Management System (DBMS) being used may have specific formatting or other data manipulation operations which could be used to present information to the user in a particular way. Even though the SQL Generator is designed to produce SQL, implementations of SQL differ from DBMS to DBMS.

By the addition of a Lookup function, explicit joins can be defined in order to add columns from other tables or instances of the same table. The Lookup function can be used to define a virtual column and takes as parameters: a foreign key column (which is a foreign key column for the table where the virtual column is being placed, or a base table if it is a virtual table); and a reference column (which is a column in the table that the foreign key references). The remaining three uses employ this function to avoid complexities which are not addressed by current query systems.

(4) Eliminating complexity caused by alternate foreign keys. Tables often have multiple ways of joining, represented by alternate foreign keys. This can be a source of confusion for the user. For example, using the tables of FIGS. 1A–1G, the PRODUCT table (FIG. 1B) has two foreign keys, VENDOR# and ALT_VENDOR#. To aid the user in accessing the database, the Administrator would define virtual columns within the PRODUCT table for Vendor Name and Alternate Vendor Name, so that it appears to the user that they can easily find the vendor's names without resorting to looking in multiple tables for the information. However, this would generally confuse a query system because their are two foreign keys for use in joining the tables. By using the Lookup function for each of the Vendor Name and Alternate Vendor Name virtual columns, different foreign key joins can be specified for each of the columns, giving the user both the vendor and alternate vendor names. The definition of the virtual columns would be:

| Table | Virtual Column | Type | Definition |
| --- | --- | --- | --- |
| PRODUCTS | VNAME | A | Lookup(PRODUCT.VENDOR#, VENDOR.NAME) |
| PRODUCTS | AVNAME | A | Lookup(PRODUCT.ALT_VENDOR#,VENDOR.NAME) |

(5) Eliminating complexity caused by code tables

This is a special case of the alternate foreign keys case (4) above. Many databases have a code table whose purpose is to store the name and other information about each of several codes. The tables themselves only contain the code identifications. If a single table has multiple code columns which use the same table for information about the codes there is a potential for the alternate foreign key problem. The user instead of asking for products with "status_id='007' and type_id='002'" would prefer to ask for products with "status='open' and type='wholesale'". Using the Lookup scheme, two virtual columns for the textual status and type can be added to the products table.

(6) Eliminating complexity caused by self-referencing tables

For example, each employee in an employee table may have a manager who himself is an employee—the manager column refers back to the employee table. Using the Lookup function, virtual columns for each employees managers name, salary, etc. can be added to the employee table. To perform the actual query, a self join will be required. Using the employee table example for a table called EMP and a column MGR being a foreign key relating to the EMP table, the virtual column definitions would be:

| Table | Virtual Column | Type | Definition |
| --- | --- | --- | --- |
| EMP | MNAME | A | Lookup(EMP.MGR, EMP.LNAME) |
| EMP | MSAL | N | Lookup(EMP.MGR, EMP.SAL) |

7. Join path definitions

In certain circumstances it is possible to join two tables by multiple paths. For example, in the tables shown in FIGS. 1A–1G, the SALESPEOPLE table can be joined with the ORDERS table by two different paths. This is easiest to see in FIG. 6. By following the direction of the arrow, SALESPEOPLE are connected directly to ORDERS or they can be connected to ORDERS via CUSTOMERS. In a query of the database, the manner in which the join is performed yields different results with different meanings.

(1) If SALESPEOPLE is joined directly with the ORDERS table, the result will indicate which salesperson actually processed the order.

(2) If SALESPEOPLE is joined to ORDERS via CUSTOMERS, the result will indicate the current salesperson for the customer on the order.

The Administrator can add to the conceptual layer a set of join paths for each pair of tables if desired. If multiple join paths are defined, a textual description of each join is also included. When the query is being generated, the system will prompt the user for which type of join the user prefers in an easy to understand manner. In the above example, when a user creates a query which joins the SALESPEOPLE and ORDERS tables the Query Assistant will generate the following dialog box:

Please clarify your query by indicating which of the following choices best characterizes the data you wish displayed:
1. Use the salesperson that actually processed the order.
2. Use the current salesperson for the customers on the order where the text in the choices is defined by the Administrator and correlates with the join path taken and used by the system.

If no join paths are defined for a given pair of tables, the shortest path is used by the system when creating a query. This can be determined by using a minimal spanning tree algorithm or similar techniques commonly known in the art.

8. Non-equijoins

The table joins discussed in the preceding examples have been equijoins. They are called equijoins because the two tables are combined or joined together based on the equality of the value in a column of each table (i.e. SALESPERSON#=SALESPERSON#, however, the column names need not be the same). In the illustrated embodiment, the Administrator can also provide in the conceptual layer definitions for non-equijoin relationships between tables which will join rows from two different tables when a particular condition is met. For example, another table ORDTYPE could be added to the example of FIG. 1A–1G that provides different classifications for orders of dollar amounts in different ranges:

| Low | High | Type |
|---|---|---|
| 0 | 10000 | Small |
| 10000 | 50000 | Medium |
| 50000 | 1000000 | Huge |

Using a non-equijoin, a record from the ORDERS table could be joined with a record from the ORDTYPE table when ORDER_DOLLARS<=LOW (from ORDTYPE table)<=HIGH. Instead of an equality relationship, there is a relationship based on a range of values.

The Administrator codes the non-equijoin as an SQL condition. For the above example, the Administrator would specify that ORDERS should be joined with ORDTYPE "Where ORDERS.ORDER_DOLLARS>=ORDTYPE.Low AND ORDERS,ORDER_DOLLARS<ORDTYPE.High". It will also become evident that the procedures for specifying non-equijoins could be implemented in a manner similar to Query Assistant 10 to ensure correctness. The condition is stored in SQL so as to be directly used during the conversion from the intermediate language to the target language SQL. However, it is obvious to an artisan that the condition could be stored in an internal representation equivalent to the SQL condition or other target language.

III. QUERY ASSISTANT

Figure 7:
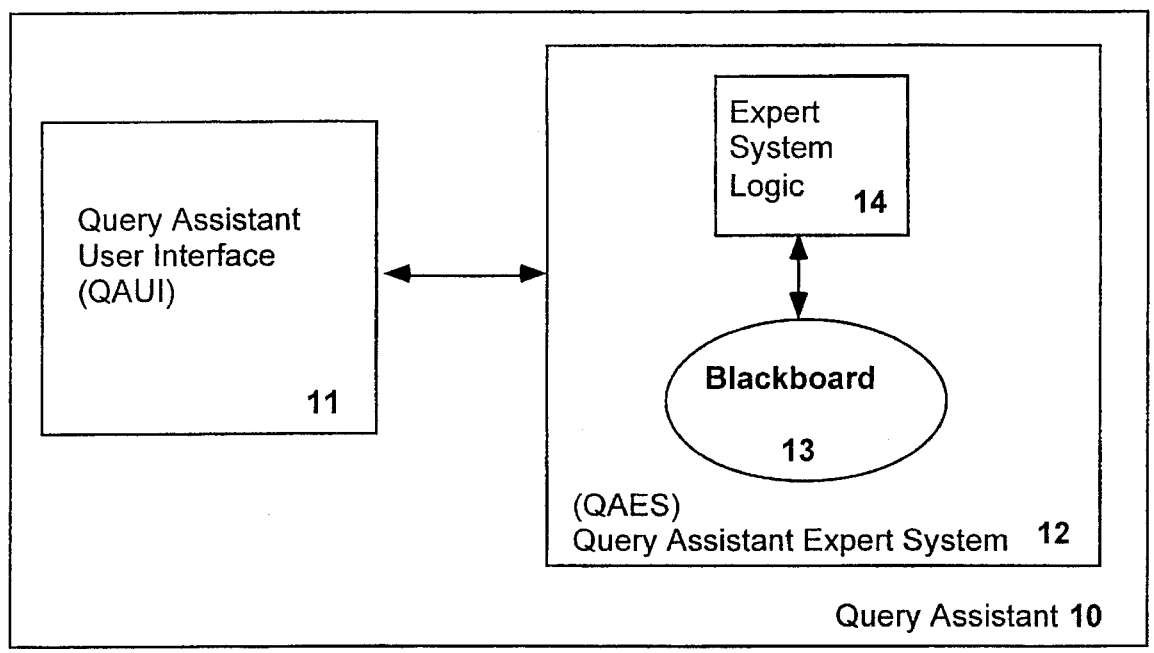
FIG. 7 is a block diagram of the Query Assistant.

FIG. 7 shows a block diagram of the Query Assistant 10. It has two components: The Query Assistant User Interface (QAUI) 11 and the Query Assistant Expert System (QAES) 12. QAUI 11 performs the functions of displaying the current state of the query to the user and providing a set of choice to the user for constructing a semantically correct query.

B. Query Assistant User Interface (QAUI)

Figure 8:
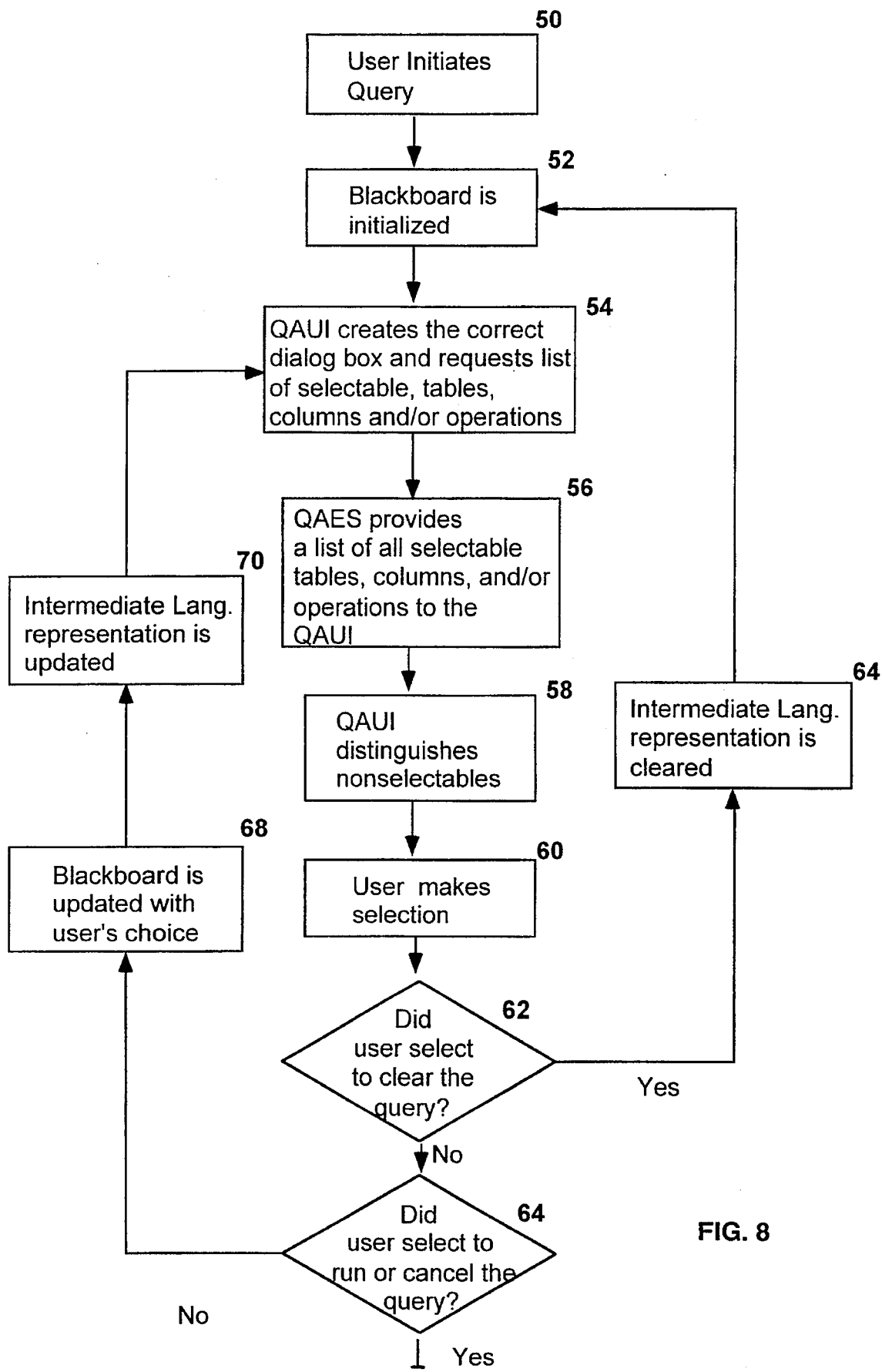
FIG. 8 is a flow chart of the flow of control of the Query Assistant User Interface.

QAUI 11 interacts with the user and QAES 12 to formulate a query in the intermediate language. Through the interface, the user initiates a query, formulates a query, runs a query, and views the results. FIG. 8 shows the basic flow of control of QAUI 11. When a user initiates a query at step 50, QAUI 11 calls QAES 12 to initialize the blackboard at step 52, then, in steps 54–58, continuously presents to the user a set of choices based on the current context in the query, as limited by the rules in QAES 12. After the user makes a selection at step 60, the system QAUI 11 determines whether the user selected to clear the query (step 62), and, if not, whether the user selected to run or cancel the query (step 66), the blackboard is updated at step 68 and an intermediate language representation is updated at step 70. This continues until the user either clears the query (at step 62, in which case the intermediate language representation is cleared at step 64) or cancels or runs the query (at step 66), in which case the appropriate action is taken.

Figure 9:
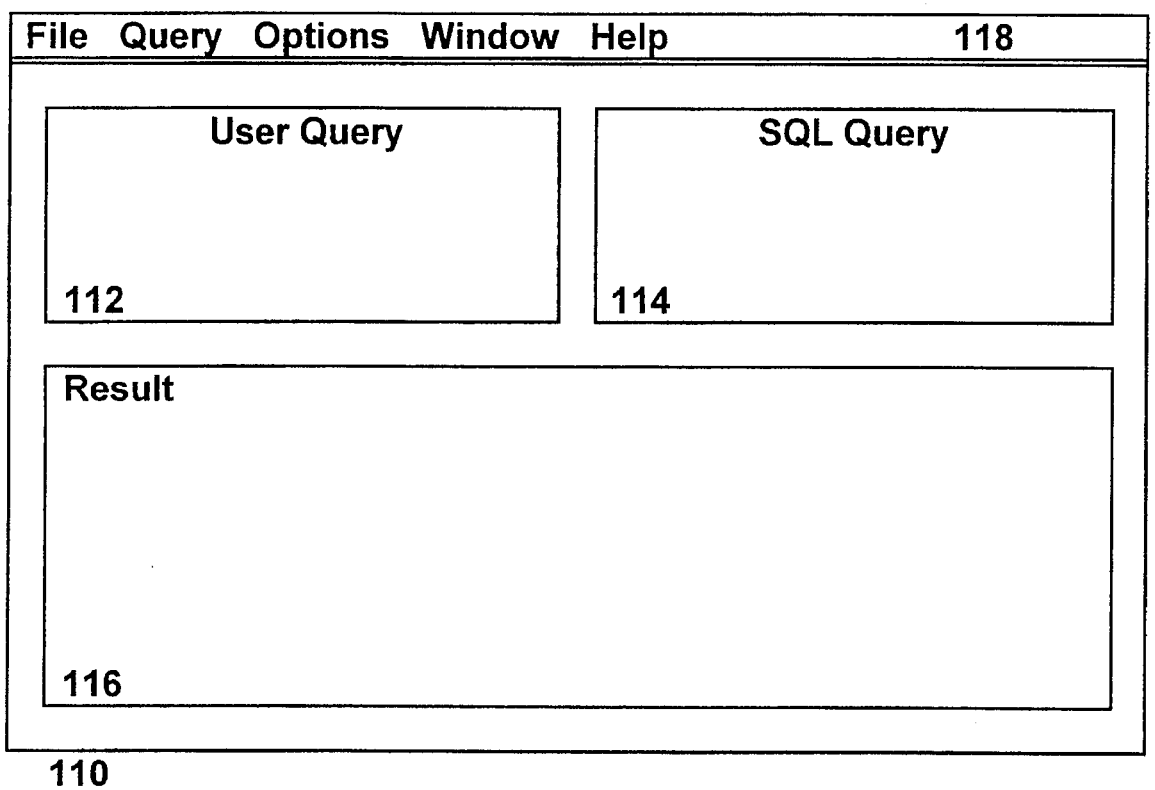
FIG. 9 is a depiction of the initial screen of the user interface.

FIG. 9 shows the initial screen 110 presented by QAUI 11 to the user. Initial screen 110 has four areas: User Query window 112 (where the query in the intermediate language is built up); SQL Query window 114 (where the SQL equivalent of the User Query is displayed after the User Query is formulated); Result window 116 (where the result is displayed after the SQL Query is applied to the Database Management System); and menu bar 118 (providing access to a set of drop down menus that allow the user to select databases, select conceptual layers, interface to report generators, save and load queries, clear the current query, run the current query, set system defaults, etc.).

The user can invoke Query Assistant 10 by selecting it from a drop down menu under the Query heading. This brings up a query selection menu listing the various types of queries Query Assistant 10 can handle. This is based on the range of queries the intermediate language is capable of handling and the query generation routines built into Query, Assistant 10. Optionally, the administrator can limit the types of queries which the user can use on a given database by so specifying in the conceptual layer. If the user is limited to a single kind of query, then the query list is bypassed. In the illustrated embodiment, the query selection menu includes:

Show . . .
What percent of . . . have . . .
Compare . . . against . . .
Show . . . as a percentage of . . .

The "Show . . . " query, covers approximately 99% of all queries and is the basic command to view certain columns or calculations thereon. The other queries are special types for percentage and comparison calculations. The type of result desired is obvious from the query excerpt in the display. This is in part due to the design of the intermediate language to make difficult query concepts easy to understand.

Figure 10A:
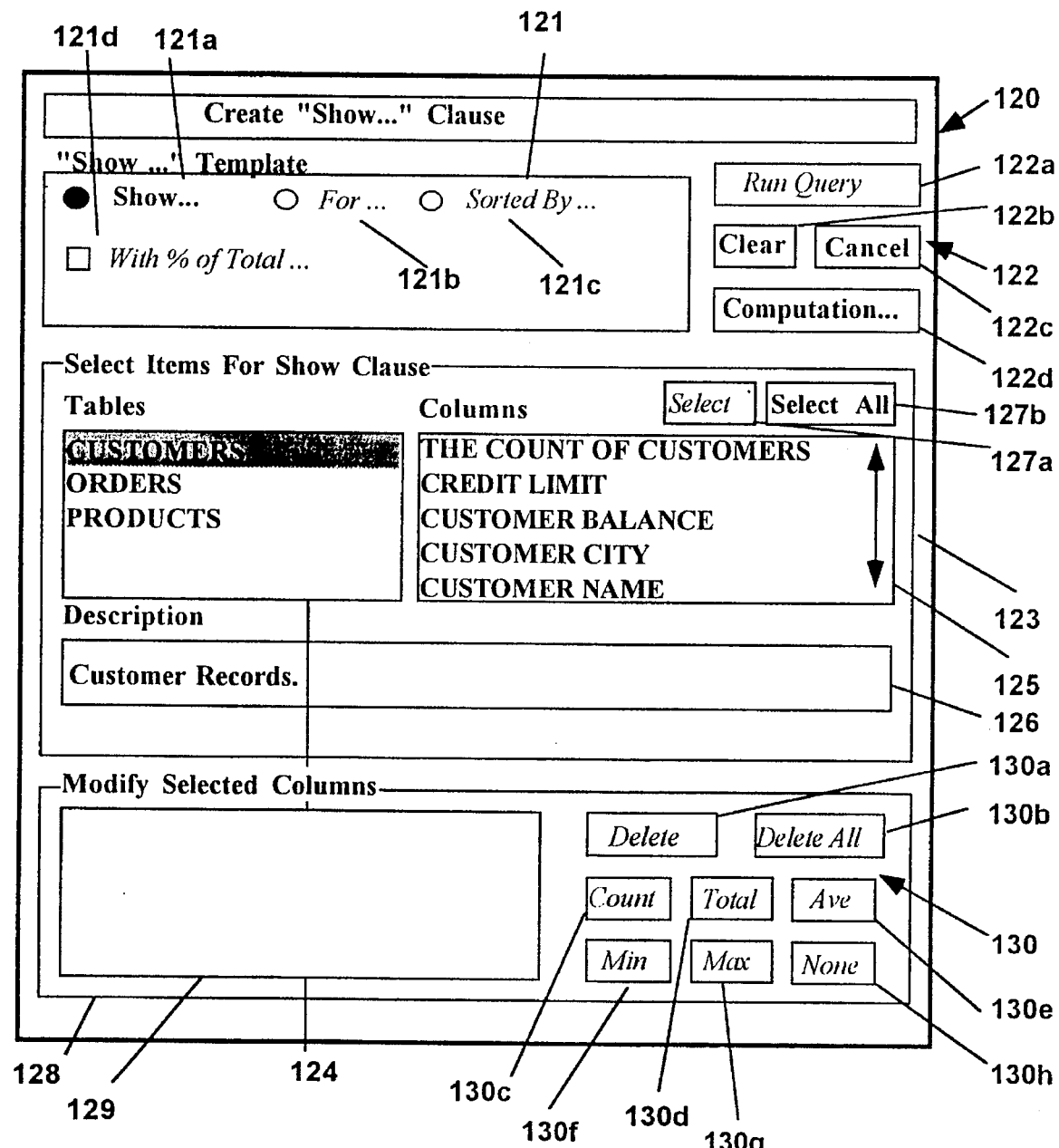

When the user selects the "Show . . . " query, the Create Show Clause dialog box 120 (shown in FIG. 10A) is displayed. This is the primary means for interaction between the user and the Query Assistant. For purposes of illustration in the figures, items that can be selected by the user are in bold face, and items which cannot be selected are in italics. Other ways of distinguishing selectable items include: 'graying out' unselectable items by displaying them in lighter shades or different color: or inhibiting the display of non-selectable items so that only selectable items are displayed. The selections status (whether or not an item can be selected) is specified either by QAUI 11 or by a call to QAES 12. Procedural rules are governed by the QAUI and expert system rules which define the selectable tables, columns, and operations are governed by QAES 12. Procedural rules include, but are not limited to:

1. conditions or sort order on a query, cannot be specified until something for display has been specified:

2. an individual column cannot be selected until it is highlighted;

3. a query cannot be run before something has been entered; and 4. items cannot be deleted until there is at least one item to delete.

The section designation window 121 of Create Show Clause dialog box 120 allows the user to designate what section or clause of the query is being entered. Window 121 includes Show, For, Sorted By, and With % of Total sections 121*a–d*, respectively. The user need not designate the sections in any specific order except that at least one column must be designated to be shown before the other clauses can be specified. However, the user may move back and forth between the sections. For example, a user may specify one column to show, then fill in For section 121*b*, return to designate more columns to be shown, then designate a Sorted By column by selecting Sorted By section 121*c*, etc.

The control section 122 of dialog box 120 includes a set of selection buttons 122*a–d* by which the user can direct the system to run the query, clear the query, cancel creating a query, and create a column to show a computation. Computations are discussed in more detail below.

In item selection window 123, the user can select tables and columns as specified in the conceptual layer, including any virtual tables or columns and any name substitutions. Any hidden tables or columns are hidden. Item selection window 123 includes table selection window 124, column selection window 125, description box 126, and Select and Select All buttons 127*a* and 127*b*. For purposes of example, FIG. 10A uses the tables of FIGS. 1A–1G with several tables hidden, the columns renamed, and a generated column "THE COUNT OF CUSTOMERS" defined in the virtual layer as a Count on the table CUSTOMERS. By moving the highlighted bar from table to table in table selection window 124, the list of available columns for the highlighted table is displayed in column selection window 125. The Select and Select All buttons 127*a*. 127*b* allow the user to select a column to show. Description box 126 shows a description for the highlighted table or column if a description is present in the conceptual layer.

The user can modify selected columns in the column modification window 128. Columns selected for the Show clause are listed in display window 129. The user can apply aggregate computations (i.e. count, total, average, minimum, and maximum) to the selected columns or unselect them via aggregate buttons 130*a–h*.

Figure 10B:
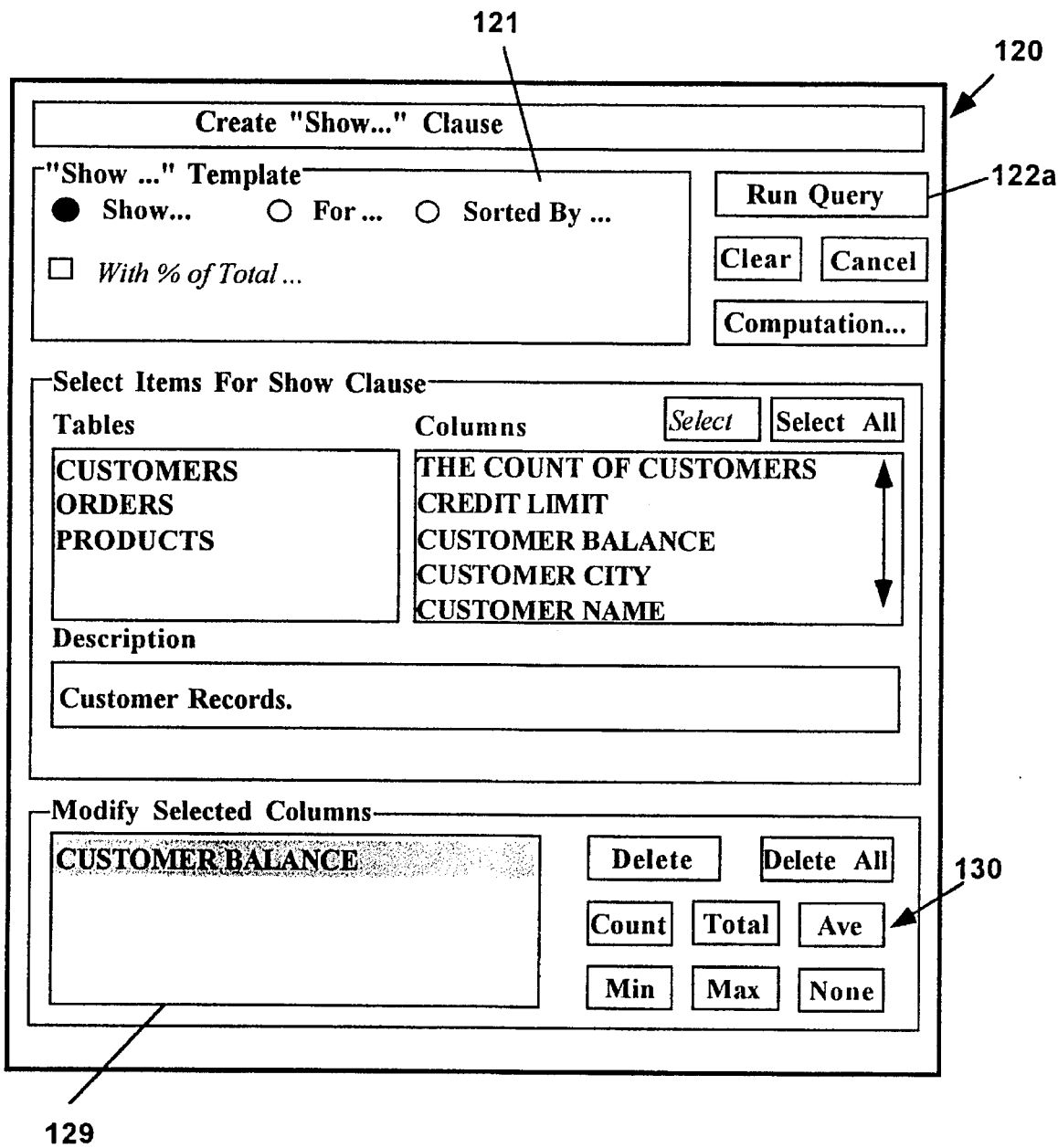

After the user makes a selection (of a table in table selection window 124 or a column in column selection window 125), QAUI 11 communicates with QAES 12 to update blackboard 13 and to request a new set of allowable selections. In addition, User Query window 112 of initial screen 110 is updated to reflect the query at that point in the intermediate language. If the selection made by the user causes certain items to become selectable or nonselectable, dialog box 120 is updated to reflect that. For example, FIG. 10B shows dialog box 120 after the user has selected the CUSTOMER BALANCE column of the CUSTOMERS table to display and has further selected to modify the column (indicated by the column being shown in display window 129). In response, QAUI 11 has modified dialog box 120 in several ways. First, aggregate buttons 130*a–h* are now selectable. QAES 12 has informed QAUI 11 that these buttons can be selected based on the determination that CUSTOMER BALANCE is numeric and that placing an aggregate on it would not create a semantically incorrect query. Had the user selected CUSTOMER NAME instead, QAES 12 would only have made Count button 130*c* and None button 130*h* selectable since the other types of aggregates require a numeric column. Also, For and Sorted By sections 121*b*, 121*c*, in section designation window 121 are now selectable, as is the Run Query command 122*a* in control section 122 since the Show section has something to show. User Query window 112 of initial screen 110 would now contain the string "SHOW CUSTOMER BALANCE".

Figure 10C:
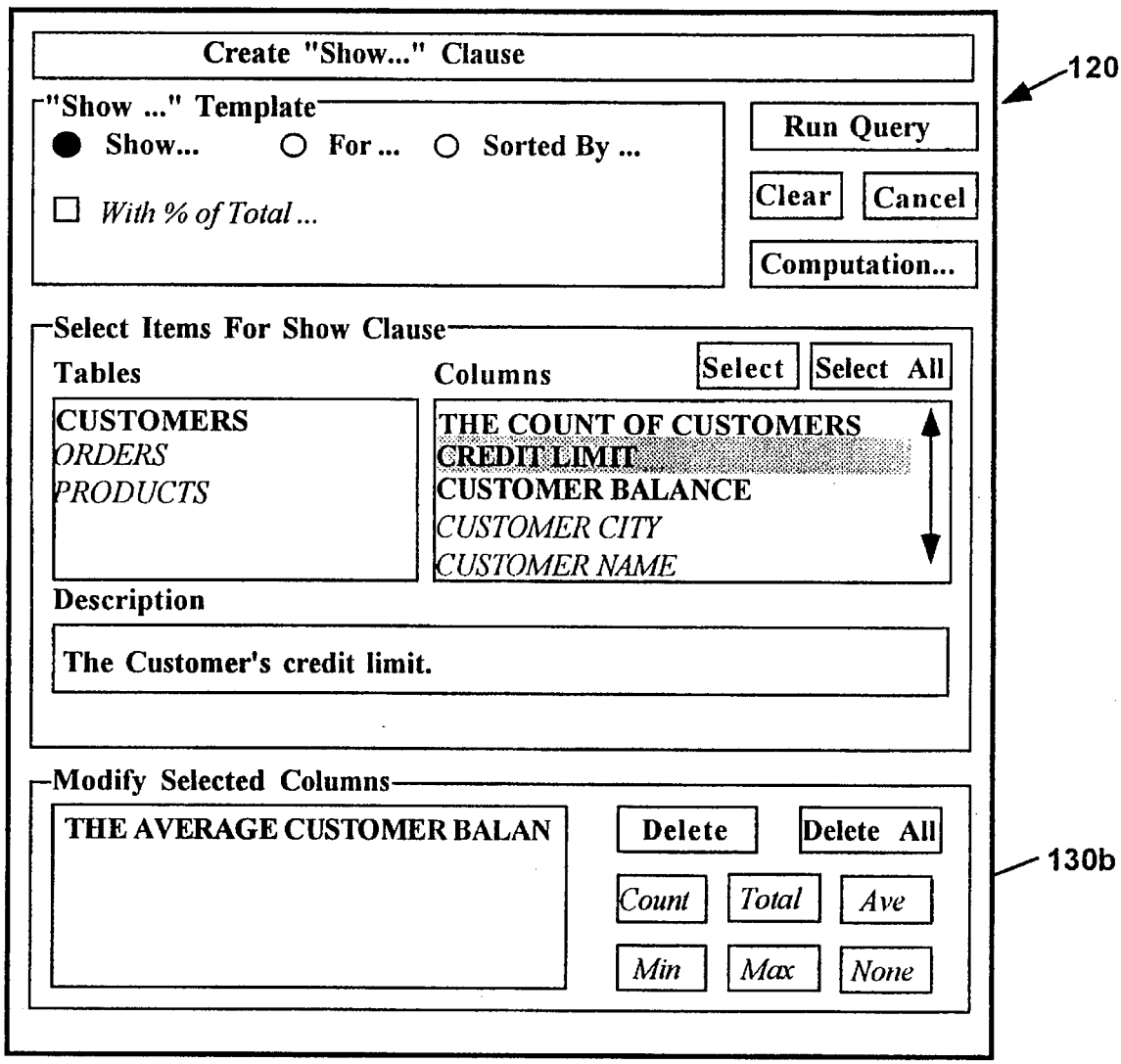

FIG. 10C shows the state of dialog box 120 after the user has asked to find the average of CUSTOMER BALANCE (via Average button 130*e*) and is preparing to select another column for display. Since the average aggregate has been placed on a numeric column, all the rows will be averaged together. Therefore, no joins to one-to-many tables are allowed and only other numeric columns which can be similarly aggregated can be selected. This has been determined by QAES 12 upon request by QAUI 11 and can be seen in dialog box 120 where all other tables and all non numeric columns have been made nonselectable. Had there been a virtual numeric column from another table present it also would not be selectable since a join is not allowed. If the user selects CREDIT LIMIT, QAUI 11 will be notified by QAES 12 that an aggregate is required and will put up a dialog box requesting which aggregate the user would like to use.

The user may also ask to see results that are actually computed from existing columns. In that case, the user can select Computation button 122*d*. This selection causes QAUI 11 to display computation dialog box 135, shown in FIG. 10D. Computation dialog box b allows the user to build computations of the columns. QAUI 11 requests of QAES 12 which tables, columns and operations are selectable here as well. The state of computation dialog box b as shown in FIG. 10D is as it would be at the start of a new query. However, all non-numeric fields are not selectable since computations must occur on numeric columns. This rule is stored in QAES 12.

Figure 10E:

When the user selects Sort By section 121*e* of section designation window 121, QAUI 11 displays Sorted By dialog box 140, shown in FIG. 10E. This dialog box is very similar to Create Show Clause dialog box 120. As with the other dialog boxes, QAUI 11 works with QAES 12 to specify what columns can be selected by the user for use in the "Sort By . . . " section. Note, the generated column THE COUNT OF CUSTOMERS is not selectable since it is actually an aggregate computation that cannot be used to sort the results of the query.

Figure 10F:
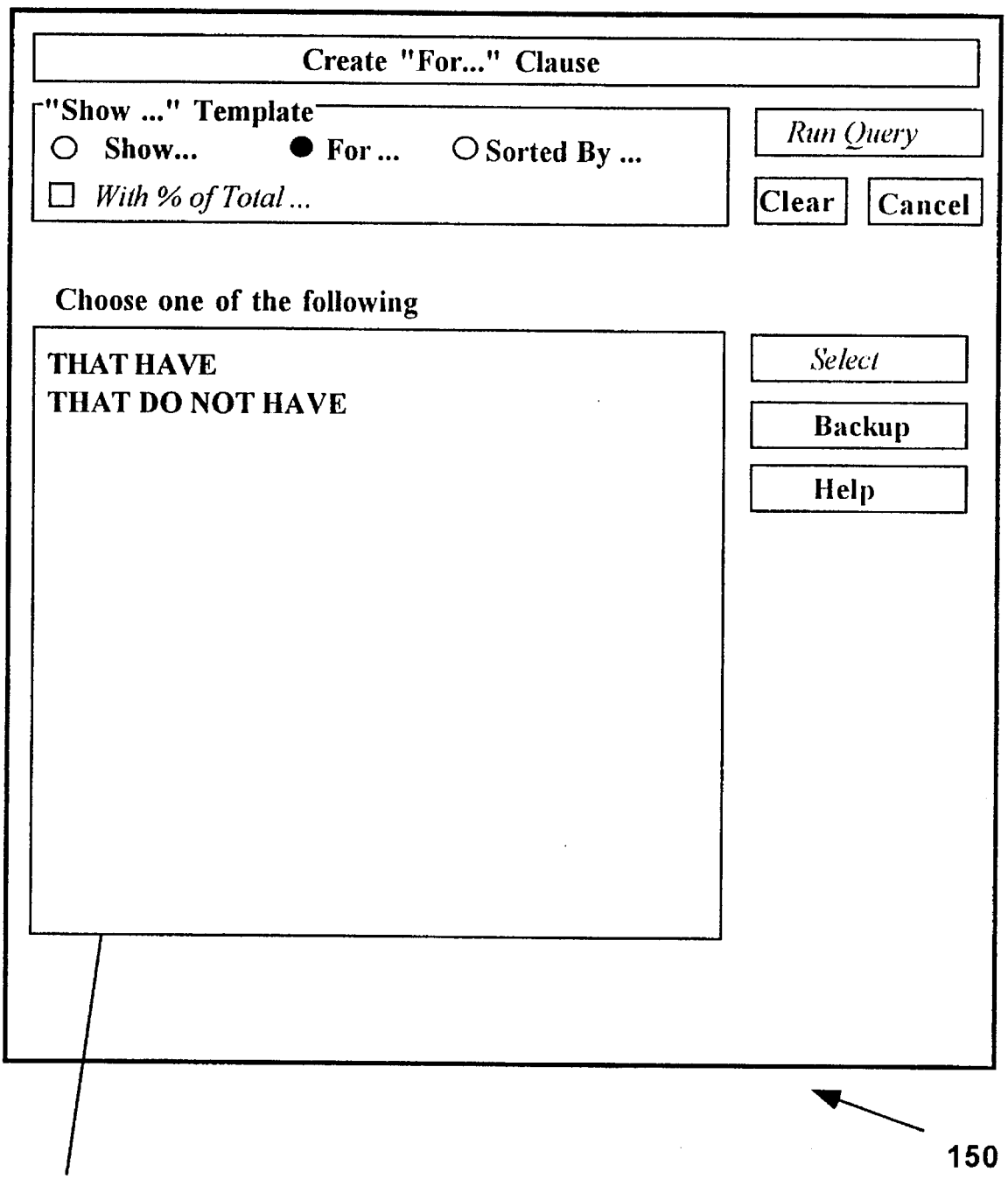

The For section, which is used to place a condition on the result, is more procedural in nature. If the user selects For section 121*b* in section designation window 121, QAUI 11 presents the user with a series of Create For Clause dialog boxes of the form shown in FIG. 10F, which provide a list of available choices in the creation of a "For . . . " clause. FIG. 10F shows the first Create For Clause dialog box 150. A list of available choices is presented in choice window 151. The displayed list changes as the user moves through the For clause. In dialog box 150, the user can select to place a condition to limit the result of a query to rows "THAT HAVE" or "THAT HAVE NOT" the condition. When the user is required to enter a column in formulating the condition, the second Create For Clause dialog box 160, shown in FIG. 10G, is displayed, with the tables, columns and operations designated as either selectable or nonselectable in a manner similar to the prior dialog boxes. In this way the user builds a condition clause from beginning to end. The With percent of total section is simply a flag to add "WITH PERCENT OF TOTAL" to the end of the query. This provides a percent of total on a numeric field for every row in the result, if the query is sorted by some column. The other three types of queries have similar sections which are handled by QAUI in a similar way:

1. What percent of . . . have . . . queries have three sections, the "What percent of . . ." section, the "With . . ." section and the "Have . . ." section. In the "What percent of . . ." section the user is requested to select any table in the database as seen through the conceptual layer. Both the "With . . ." and "Have . . ." section ask for conditions as in the "For . . ." clause mentioned above.

2. Compare . . . against . . . queries have the following sections: "Compare . . .", "Against . . .", "Sort By . . .", and two "For . . ." sections. The query compares two numeric columns or computations which can have a condition placed on them in their respective "For . . ." sections. Also the result can be sorted similarly to the "Show . . ." query. QAUI 11 handles each section similarly to the "Show . . .", "For . . .", and "Sort By . . ." sections discussed above, with additional conditions placed on what can be selected set by QAES 12.

3. Show . . . as a percentage of . . . is treated the same by QAUI 11 as the Compare . . . query above except that "Compare" is replaced with "Show", and "against" is replace with "as a percentage of". This query is a special kind of comparison query.

The sections of the queries relate to the various portions of the target language SQL, however the actual terms such as "Show", "Compare", "That Have", etc. are a characteristic of the intermediate language used. As discussed more fully below, the intermediate language is designed in terms of the target language. Therefore QAUI 11 is designed with the specific intermediate language in mind in order to guide the user in creating only semantically correct queries.

B. Query Assistant Expert System (QAES) QAES 12 is called by QAUI 11 to maintain the internal state information and to determine what are allowable user choices in creating a query. Referring to FIG. 7, QAES 12 contains Blackboard 13 and Query Expert 14 which, based on the state of Blackboard 13, informs QAUI 11 what the user can and cannot do in formulating a semantically correct query. Query Expert 14 provides QAUI 11 access to the blackboard and embodies the intelligence which indicates, given the current state of Blackboard 13, what choices are available to the user for constructing a semantically correct query.

1. Blackboard

A blackboard is a conceptual form of data structure that represents a central place for posting and reading data. In the present invention. Blackboard 13 contains information about the current state of the system. As a query is being formulated by the user, Blackboard 13 is modified to reflect the selections made by the user.

Within the listed variables. Blackboard 13 maintains the following information:
- whether or not a query is being created.
- the type of query (Show, what % of, etc.)
- the current clause (Show, For, Subquery, Sorted By, etc.)
- the current set of choices of what can be selected by the user (for backup capability)
- the set of tables selected for each of the current clause, whole query, and any subqueries
- the table involved in a Count operation, if any (there can only be one)
- the table involved in an aggregate operation (there can only be one)
- the table involved in a computation operation (there can only be one)
- the base table / virtual table relationship for any virtual table columns
- a string defining each condition clause (i.e. For, With, Have)

To access and manipulate the data, the following routines are provided:
- Initialize Blackboard (This sets all of the variable to zero or null state prior to the start of a query)
- Set Query Type
- Set Current Clause
- Backup current set of selectable tables, columns, and operations.
- Restore backup of set of selectable tables, columns, and operations.
- Add table to set of tables selected for each of the current clause, whole query, and any subqueries
- Remove table from set of tables selected for each of the current clause, whole query, and any subqueries
- Read list of tables selected for each of the current clause, whole query, and any subqueries
- Read/Write/Clear table involved in Count operation
- Read/Write/Clear table involved in aggregate operation
- Read/Write/Clear table involved in computation operation
- Read/Write any base table <-> virtual table relationship for any virtual columns
- Add/Remove text from string containing the whole intermediate language query and each condition clause (i.e. For, With, Have)

Possible methods for physical implementation of the blackboard include, but is not limited to, a set of encapsulated variables, database storage, or object storage, each with appropriate access routines.

After the user makes each selection in the process of building a query, Blackboard 13 is updated to reflect the current status of the query and Query Expert 14 can use the updated information to determine what choice the user should have next.

1. Query Expert

Query Expert 14 utilizes information stored on Blackboard 13 and information from the conceptual layer about the current database application to tell QAUI 11 what are the available tables, columns, and operations that the user can next select when building a query. Query Expert 14 makes this determination through the application of a set of rules to the current data. Although the rules used by the system are expressed in the illustrated embodiment by a set of If. . .Then. . . statements, it should be evident to the artisan that the rules may be implemented procedurally, through a forward or backward chaining expert system, by predicate logic, or similar expert system techniques.

Query Expert 14 examines each table and each column in each table to determine whether it can be selected by the user based on the current state of the query. Query Expert 14 also determines whether a selected table and/or column can be used in aggregate or computation operations. In addition, during the creation of a conditional "For . . ." clause, Query Expert 14 addresses further considerations.

Query Expert 14 uses some similar and some different rules during construction of each of the sections of a query. For each section of the "Show . . ." query described above, the rules employed by the Query Expert to designate what tables, columns, and operations the user can select in generating a semantically correct query are set forth below.

1. The "Show . . ." section. Below is a set of rules used to determine what tables, columns and operations are selectable by the user. The term "current clause" used within the rules refers to the entire Show . . . query. The current clause becomes important in the other three types of queries which have two separate sections used in comparisons. Each of those sections are separate clauses for the purpose of the rule base.

TABLES: For each Table(x) in the database, if the following Table rules are all true, then the table is selectable. A role of the form If . . . Then TRUE has an implied Else FALSE at the end, and there is similarly an implied Else TRUE after an If . . . Then FALSE. A table which is hidden, according to the conceptual layer, is not presented to the user for selection, but is processed by the rules in case virtual columns in non hidden tables are based on the hidden tables. If the hidden table cannot be selected, then any virtual table relying upon it cannot be selected.

Rule 211

```
IF    the current clause is empty;
      Table(x) is a table already included in the current clause;
      there is only one other table in the current clause, and it can be
      joined
      with Table(x); or
      more then one table already exists in the current clause, and adding
      the
      new table results in a navigable set (There is a single common
      most
      detailed table between the tables.)
Then  TRUE
```

-continued

```
      Table(x) only through a more detailed table then there is a conflict)
Then  FALSE
Rule 214

IF    Table(x) is following an aggregate command, and
      (there are no tables in the query;
      there is another aggregate present and either Table(x) already has
      an
      aggregate operation applied or has a one-to-one relationship with
      the
      already aggregated table; or
      there is not another aggregate present, and Table(x) is the most
      detailed
      table in the query (in one-to-many relationships, the many side is
      more
      detailed then the one side)
Then  TRUE
```

COLUMNS: For all Column(x) in a Table(x), if all the following Column rules are not false, the columns are selectable, else they are not.

```
Rule 221
IF    Table(x) is not selectable
Then  FALSE
Rule 222
IF    Column(x) is a virtual column; and
      the table on which the column is based is not selectable
Then  FALSE
Rule 223
IF    There exists an aggregate on a Column(y);
      Column(y) is based on the same table as Column(x) or is based on a table
      with a one-to-one relationship with the table on which column(x) is based;
      and
      Column(x) is non-numeric
Then  FALSE
```

-continued

Rule 212

```
IF    Table(x) is the base table of a virtual table with a condition clause;
      and
      the virtual table has already been selected
Then  FALSE
Rule 213

IF    There is an aggregate being performed in the current clause; and
      Table(x) conflicts with the table that the aggregate is being applied
      to (If
      Table(x) is more detailed then the aggregate table or is joinable
      with
```

COMPUTATIONS: The same rules apply to the use of tables and columns in computations accept for additional Computation rule 231, on Column(x) which must be true.

```
Rule 231
IF    Column(x) is selectable; and
      Column(x) is numeric.
Then  TRUE
```

AGGREGATE OPERATIONS: For each aggregate operation Aggregate(x) (i.e., count, total, min, max, average) to be selectable for a selected column, Column(y), the following Aggregate rules must be true.

```
Rule 241
IF    Column(y) is numeric; or
      Column(y) is non-numeric and Aggregate(x) = COUNT
Then  TRUE
Rule 242
IF    There exists an aggregate on a Column(z);
      Column(z) is based on the same table as Column(y) or is based on a table
``` with a one-to-one relationship with the table Column(y) is based on.
Then TRUE
Rule 243
IF applying Aggregate(x) to Table(x) would cause a conflict with another
table in the current clause (If Table(x) is less detailed then another table in
the current clause then there is a conflict)
Then FALSE SPECIAL RULE: Special rules 251 is applied when a Column(x) is selected for display. Special rule 251 requires the user to enter an aggregate operation on the selected column.

Rule 251
IF There exists an aggregate on a Column(y);
Column(y) is based on the same table as Column(x) or is based on a table
with a one-to-one relationship with the table Column(x) is based on.;
Column(x) is selectable; and
Column(x) is selected.
Then Column(x) must have an aggregate applied, and the QAUI, at the
direction of the QAES, will request one from the user.

2. The "Sort By . . . " section. No computations or aggregates are allowed on the columns selected to sort the query by. Otherwise, the rules are similar to the "Show . . . " section, with some minor changes. Table rules 210 are the same, while Computation, Aggregate, and Special rules 231, 240, and 251 are not applied. Finally, Column rule 223 is not applied since the "Sort By . . . " section helps define a grouping order and will cause the aggregates to group by the Sort By columns. Therefore, even though an aggregate is already applied, the Sort By column cannot, and should not, be aggregated. It does not matter whether the column is numeric or non-numeric provided the table is selectable.

the user may: clear the query (which will clear the blackboard and start over); backup a step (which will undo the last choice made); or run the query (if at an appropriate point). The pseudocode is shown to cover a certain set of condition clause types, however, it will be apparent to the artisan how additional condition types can readily be added. According to the pseudocode, QAUI 11 calls the For_Clause_Top_Level_Control procedure to initiate the creation of a For clause. The Choose_entity function below is used to select a table or column and is described in more detail below.

Procedure For_Clause_Top_Level_Control 310 is a loop that creates conjunctive portions of the For clause until there are no more ANDs or ORs to be processed.

```
Procedure For_Clause Top_Level_Control
    Repeat
        ITEM = Choose_Entity ("Entity, NMD")
        Display [THAT HAVE, THAT HAVE NOT] to the user and get a response
        RESULT = Call Make_For_Clause
        Fix parentheses if necessary
        If RESULT is no AND or OR selected, Then
            Display [AND , OR] to the user and get a response
            (user can also choose to switch to a different clause or run a query)
    Until RESULT says the last item selected is not an AND or OR and the user has
        switched to a different clause selected to run a query (i.e., "For . . ." or "Sort By . . .")
End Procedure
```

3. The "For . . . " section is somewhat different from the previous two sections. Upon selecting a For condition, the user is led though a series of dialog boxes providing a set of choices to continue. Different rules apply at different points in the process of building a condition. Therefore, the knowledge as to what items are selectable by a user is contained in two forms. First, there is a procedural list of instructions, which direct the user in building a For clause, and second, there is a set of rules that are applied at specific times to tables, columns, and operations in a similar manner to the Show and Sort By clauses.

Pseudocode representations of the procedural knowledge used in directing a user to create a For clause is shown below. Although not explicitly stated in the pseudocode, after every selection made by the user, Blackboard 13 is updated, and the current query is updated for display to the user. Also, at any time during the creation of the For clause, Function Make_For_Clause 320 handles some special types of For clauses by itself and sends the general type of For clause constructs (i.e. constraints) to function Make_Constraint 330. The result of the function is an indication as to whether there is a pending And or Or in the query.

```
Function Make_For_Clause
    CHOICE = Display ['Place a condition', 'other conditions', '('] to the user and get a
response
    If    CHOICE = '(' Then
        RESULT = Call Make_For_Clause
        Add ')' to query
        Return RESULT
    Elseif CHOICE = 'Place a condition' Then
        Return the result of Make_Constraint ("Attribute, NMD", False)
    Elseif CHOICE = 'other conditions' Then
        CHOICE = Display [>,<,=,<>,>=,<=, '... FOR EVERY ...', '... OF ANY ...', 'EVERY ...']
                    to user and get a response
        If    CHOICE is from the set [>,<,=,<>,>=,<=] Then
            Get a value
            ITEM = Choose Entity ("Entity, Detail, ForTable")
            CHOICE = Display [THAT HAVE, THAT HAVE NOT, AND, OR] to user and get
                    response
            If    CHOICE is from the set [THAT HAVE, THAT HAVE NOT] Then
                Return the result of CALL Make_For_Clause
            Elseif CHOICE is from the set [AND, OR] Then
                Return an And or Or is selected
            Endif
        Elseif CHOICE is from the set ['... FOR EVERY ...', '... OF ANY ...'] Then
            ITEM1 = Choose_Entity ("Entity, Detail, ForTable")
            ITEM2 = Choose_Entity ("Entity, NLD,NOTENT")
            Return no And or Or selected
        Elseif CHOICE = 'EVERY ...' Then
            Return the result of Make_Constraint ("Attribute, Detail, ForTable", True)
        Endif
    Endif
End Function
```

Function Make_Constraint 330 is the heart of the creation of the "For" clause. It takes as parameters some QAES rule parameters and a flag which indicates whether every part of the For clause is already present when this function is called. The result of the function is an indication whether or not the last thing selected was an AND or Or.

```
Function Make_Constraint (RULE_PATTERN, EVERY_CLAUSE_FLAG)
    ITEM = Choose_Entity (RULE_PATTERN)
    If    ITEM is numeric Then SELECTION includes [<,>,<>,=,>=,<=, Between]
    Endif
    If    ITEM is alphanumeric Then
        SELECTION includes [<,>,<>,=,>=,<=, Between, Begins with, Ends with, Contains]
    Endif
    If    ITEM is a date Then
        SELECTION includes [Specific date, Since, Before, Between]
    Endif
    SELECTION = SELECTION + [is Blank, Is Not Blank]
    CHOICE = Display SELECTION to user and get response
    If    CHOICE is from the set [Is Blank, Is Not Blank] Then
        Return no And or Or selected.
    Elseif CHOICE is numeric or alphanumeric 'Between' Then
        Get before value limited to proper data type
        Got after value limited to proper data type
        Return no And or Or selected.
    Elseif CHOICE is from the set [Begins with, Ends with, Contains] Then
        Get alphanumeric value
        Return no And or Or selected.
    Elseif CHOICE is from the set [Specific date, Since, Before] Then
        Get date value
        Return no And or Or selected.
    Elseif CHOICE is date 'Between' Then
        Get first date
        Get second date
        Return no And or Or selected.
    Elseif CHOICE is from the set [<,>,<>, =, >=,<=] Then
            If    EVERY_CLAUSE_FLAG is TRUE Then
                Get value
                Return no And or Or selected.
            Else CHOICE = Display ['Enter a value', 'Place a condition', Total, Average,
                                Maximum, Minimum] to user and get response
                If    CHOICE = 'Enter a value' Then
                    Get value
                    Return no And or Or selected.
                Elseif CHOICE = 'Place a condition' Then
                    ITEM = Choose_Entity (RULE_PATTERN)
                    CHOICE = Display [OF, AND, OR] to user and get response
```

```
            If   CHOICE = OF Then
                 ITEM = Choose_Entity ("Entity, OFENT")
                 CHOICE = Display [THAT HAVE, THAT HAVE NOT, AND, OR] to
                          user and get response
                 If   CHOICE is from the set [THAT HAVE, THAT HAVE NOT]
                         Then
                         Return the result of CALL Make-For-Clause
                 Elseif CHOICE is from the set [AND , OR] Then
                         Return an And or Or is selected
                 Endif
            Elseif CHOICE is from the set [AND, OR] Then
                 Return an And or Or is selected
            Endif
         Elseif CHOICE is from the set [Total, Average, Maximum, Minimum] Then
            If   CHOICE is from the set [Total, Average] Then
                 ITEM = Choose Entity("Numeric Attribute, OFENT, NMD")
            Else    ITEM = Choose_Entity("Affribute, OFENT, NMD")
            Endif
         Endif
         ITEM = Choose_Entity ("Entity, OFENT")
         CHOICE = Display [THAT HAVE, THAT HAVE NOT, AND, OR] to user and get
                  response
         If   CHOICE is from the set [THAT HAVE, THAT HAVE NOT] Then
                 Return the result of CALL Make For Clause
         Elseif CHOICE is from the set (AND, OR] Then
                 Return an And or Or is selected
         Endif
      Endif
   Endif
End Function
```

In the above pseudocode, the function Choose_Entity is not defined. This function uses the second type of knowledge. The function is called with a set of parameters, and based on those parameters, the user is asked to choose either a table or column. As with the other clauses, this information is presented to the user in a manner to distinguish which choices the user can make. QAES 12 determines what selection the user may make by applying a set of rules to the tables and columns as in the other clauses.

There is an additional element, however, in the rule base for the For clause. The rule base is expanded to include special circumstances which are specified by a parameter Choose_Entity. The parameter, in the pseudocode, takes the form of a list of conditions in a string separated by commas. There are two types of condition, those which inform QAES 12 what type of dialog item the user will be selecting and therefore what type of dialog box to display, and those which are conditions in the rules. Types of item parameters include:

Entity—indicates that the user needs to select a table;

Attribute—indicates that the user needs to select a column; and

Numeric Attribute—indicates that the user can only select a numeric column.

If the user needs to select a table, then the rules will not be applied to the columns, since they will not be displayed. The condition type parameters are:

NMD The table can be No More Detailed then any other table in the current clause NLD The table can be No Less Detailed Then any other table in the current clause Detail The table must be the most detailed table in the current clause ForTable The table must be Identical or one-to-one with any tables in the For clause OFENT The table must be Identical or one-to-one with any table in current clause NOTENT The table must not be identical or one-to-one with any table in current clause.

In a one-to-many relationship, the table on the many side of the relationship is more detailed then the table on the one side. As discussed previously, the term "current clause" actually refers to the entire query in a Show . . . query. The current clause becomes important in the other three types of queries which have two separate section used in comparisons. Each of those sections are separate clauses for the purpose of the rule base. The rule base used in the For clause is set out below.

TABLES: Table rules 211–214 are applied. In addition, the following Table Parameter rules are applied.

```
Rule 311
IF     Parm contain "NMD"; and
       a less detailed table then Table(x) is already in the current clause
Then FALSE
Rule 312
IF     Parm contains "NLD"; and
       a more detailed table then Table(x) is already in the current clause
Then FALSE
Rule 313
IF     Parm contains "Detail"; and
       (there is a more detailed table then Table(x) in the current clause;
       Table(x) already exists in the current clause; or
```

```
                a table with a one-to-one relationship with Table(x) exists in the current
                clause and it is aggregated)
        Then    FALSE
        Rule 314
        IF      Parm contains "ForTable";
                Table(x) doesn't exist in the For clause; and
                Table(x) does not have a one-to-one relationship with any table in the For
                clause
        Then    FALSE
        Rule 315
        IF      Parm contains "OFENT";
                Table(x) doesn't exist in the current clause; and
                Table(x) does not have a one-to-one relationship with any table in the
                current clause
        Then    FALSE
        Rule 316
        IF      Parm contains "NOTENT"; and
                (Table(x) exists in the current clause; or
                Table(x) has a one-to-one relationship with any table in the current
                clause)
        Then    FALSE
```

COLUMNS: In addition to Column rules 221–223, the following Column Parameter rule is applied.

```
Rule 321
IF      Parm contains "Numeric Attribute";
        Column(x) is non-numeric
Then    FALSE
```

Computation rule 231 is also applied.

4. "With percent of Total" check box. The user can add this phrase to the end of a query if two things are true: (1) the last item in the Show clause was numeric; and (2) there is a sort specified in the Sort By clause.

The same set of rules are used in the equivalent sections of the other three query types as discussed in the earlier section on QAUI 11. These queries are considered two clause queries with each clause represented by the ellipses in the queries. Blackboard 13 is set to the current clause, and the rules which refer to current clauses use the clause being built by the user. The rules are primarily the same as the Show . . . query with the following caveats:

1. In the What percent of . . . have . . . queries, the "What percent of . . . " section is limited to one table in the database, so there are no real rules applied. The "With . . . " and "Have . . . " sections are then the same as the "For . . . " section in the Show . . . query.

2. In the Compare . . . against . . . queries, the "Compare . . . " and "Against . . . " sections are limited to a numeric columns, including aggregates and computations. Also in each of the sections, there can be only one column, aggregate or computation. The "For . . . " and "Sort By . . . " clause use the same rule sets as those in the Show . . . queries.

3. In the Show . . . as a percentage of . . . queries, the "Show . . . " and "as a percentage of . . . " sections are limited to a numeric columns, including aggregates and computations. Also in each of the sections, there can be only one column, aggregate or computation. The "For . . . " and "Sort By . . . " clause use the same rule sets as those in the Show . . . queries.

To illustrate how Query Assistant 10 prevents the user from having the opportunity to formulate the incorrect query involving the three tables CUSTOMERS. ORDERS and LINE_ITEMS from FIGS. 1A, 1F, and 1G, respectively, with the relations shown in FIG. 6, the steps that the user would take to attempt the incorrect query are described. First, the user would invoke Query Assistant 10 and select a Show . . . query. At this point all of the tables and columns would be selectable since nothing has yet been selected, however, the Run Query box is not selectable, and the other sections of the query are not selectable until there is something in the Show section. Next, the user would select the column Name in the CUSTOMERS table for display. Again, after applying the rules, all of the tables and columns are selectable. This is indicated by the rule base because all tables can be joined with CUSTOMERS, and there has not been an aggregate defined. Next, the user would select Order Dollars from the ORDERS table to display. All tables and columns are still selectable for the same reason.

Next, the user would select to modify Order Dollars. After applying the rules, QAES 12 would indicate that any of the aggregates can be applied to Order Dollars since Order Dollars is numeric and there are no other aggregates. Next, the user would select a Total on Order Dollars. After applying the rules, QAES 12 would determine that the LINE_ITEMS, PRODUCT, CODE, and VENDOR tables are no longer selectable because of Table rule 213. Also, only numeric columns are selectable in the ORDERS table and they must be aggregated as dictated by Column rule 223 and Special rule 251.

Finally, columns in the CUSTOMERS table are selectable, but cannot be aggregated because of Aggregate rule 242. The user is not allowed to select the LINE_ITEMS table once an aggregate is placed on ORDER DOLLARS so the incorrect query cannot be formulated. Similarly, if a column in the LINE_ITEMS table had been selected prior to placing the Total on Order Dollars, Order Dollars could not be aggregated because of Aggregate rule 243.

More complex queries are handled in the same way. After each user selection, QAES 12, through QAUI 11, provides a list of available choices based on knowledge it has about databases and the information it contains in the conceptual layer. It applies rules to all applicable tables, columns, and operations to determine the list of selectable items. During the creation of a For clause, a procedural component is introduced, but the method of operation is substantially the same.

IV. INTERMEDIATE LANGUAGE

As discussed earlier, because the set of semantically valid queries cannot be described by a context-free grammar, a grammar is not given for the intermediate language, and one is not used to create user choices. Rather, the intermediate language is defined by the templates and choices presented to the user by Query. Assistant 10. The templates are screen definitions whose contents (i.e. picklist contents and active vs. inactive elements) are governed by QAES 12. Condition clause generation is driven by a separate module in QAES 12. The definition of the intermediate language is precisely those queries that can be generated by Query Assistant 10.

The design of the intermediate language, however, is driven from the bottom (SQL Generator 20) and not the top (Query. Assistant 10). The architecture of Query System 1 is designed to minimize the amount of processing by SQL Generator 20 by making the intermediate language as similar as possible to the target language (SQL) while providing a more easily understandable set of linguistic constructs. Building upon the design of the language, Query Assistant 10 is built to implement the production of semantically correct queries using the linguistic constructs of the language, which in turn can further simplify the design of SQL Generator 20.

In natural language systems, the problem lies in convening a representation of a natural language to a target language, such as SQL. In the present invention, conversion of the intermediate language to a target language is straightforward because the intermediate language was designed to accommodate this process. The intermediate language is designed by starting with the target language (n the illustrated embodiment, SQL), and making several modifications.

First, the grouping and table specification constructs, which in SQL are specified by the GROUP BY, HAVING, and FROM clauses respectively, are deleted, so that the user need not specify them. Rather, this information can be inferred readily from the query. For example, if the user selects a column for display, the table from which the column comes needs to be included in the table specification (i.e. FROM clause). When a user selects to view columns in a table without selecting a primary key, the user would likely want to see the column results grouped together, so that like values are in adjacent rows of the output and duplicates are discarded. This is specified in the GROUP BY clause of SQL, but it can be inferred. In SQL, the HAVING clause is a special clause which operates as a WHERE clause for GROUP BY items. This is also readily inferred from which columns are grouping columns and if they have specified conditions.

Second, join specifications are deleted from the condition clause. SQL requires an explicit definition of the joins in its WHERE clause (i.e. WHERE CUSTOMER.CUSTOMER#=ORDER.CUSTOMER#). This information can be inferred or specifically requested when creating a query if necessary, but it does not form a part of the intermediate language query.

Third, specific and readily understandable patterns are defined for each type of subquery supported by the intermediate language. For example, the English pattern "MORE THAN 2<category>" can be defined to have a specific SQL subquery expansion.

Fourth, the remainder of the target language is replaced with easily understandable words or phrases that, when strung together, form a comprehensible sentence. For example, using SQL, "SELECT" is replaced with "Show". "WHERE" is replaced with "For", "ORDER BY" is replaced with "Sorted By" and so on.

Finally, synonyms are provided for various words, phrases and constructs. Target language constructs may look differently in the intermediate language depending on the type of query to be formed if the query is to be an easily understood sentence. This also allows the user multiple ways of specifying concepts, including, but not limited to: dates (i.e. Jan. 1, 1994 v. 01/01/94. etc.), ranges (between x and y, >x and <y, last month, etc.); and constraints (>, Greater Then. Not Less Than or Equal).

V. SQL GENERATOR

Given the design of the intermediate language described above, SQL Generator 20 need only perform two basic functions. First, it needs to inter the implicit portions of the query that are explicitly required in the target language, such as the GROUP BY clause in SQL, or the explicit joins in the WHERE clause. This information is easily inferred because of the design of the intermediate language. Second, SQL Generator 20 needs to resolve synonyms and transform the more easily understood intermediate language into the more formal target language through a series of transformations by pattern substitution. It is this set of patterns that give the intermediate language its basic look and feel.

Internally, the intermediate language has a component that is independent of the database application, and a component that is specific to the database application. The application independent component is represented by the sets of patterns used in the pattern substitution transformations and the set of routines used to infer implicit information. The application specific component is represented by the conceptual layer which contains information used in both basic functions of SQL Generator 20.

SQL Generator 20 has no expertise concerning what is and is not a semantically valid query in the intermediate language. If the user bypasses Query Assistant 10 to directly enter a query using the syntax of the intermediate language, the user can obtain the same incorrect results that can be obtained with conventional point-and-shoot query tools.

A. Flow of Control

Figure 11A:
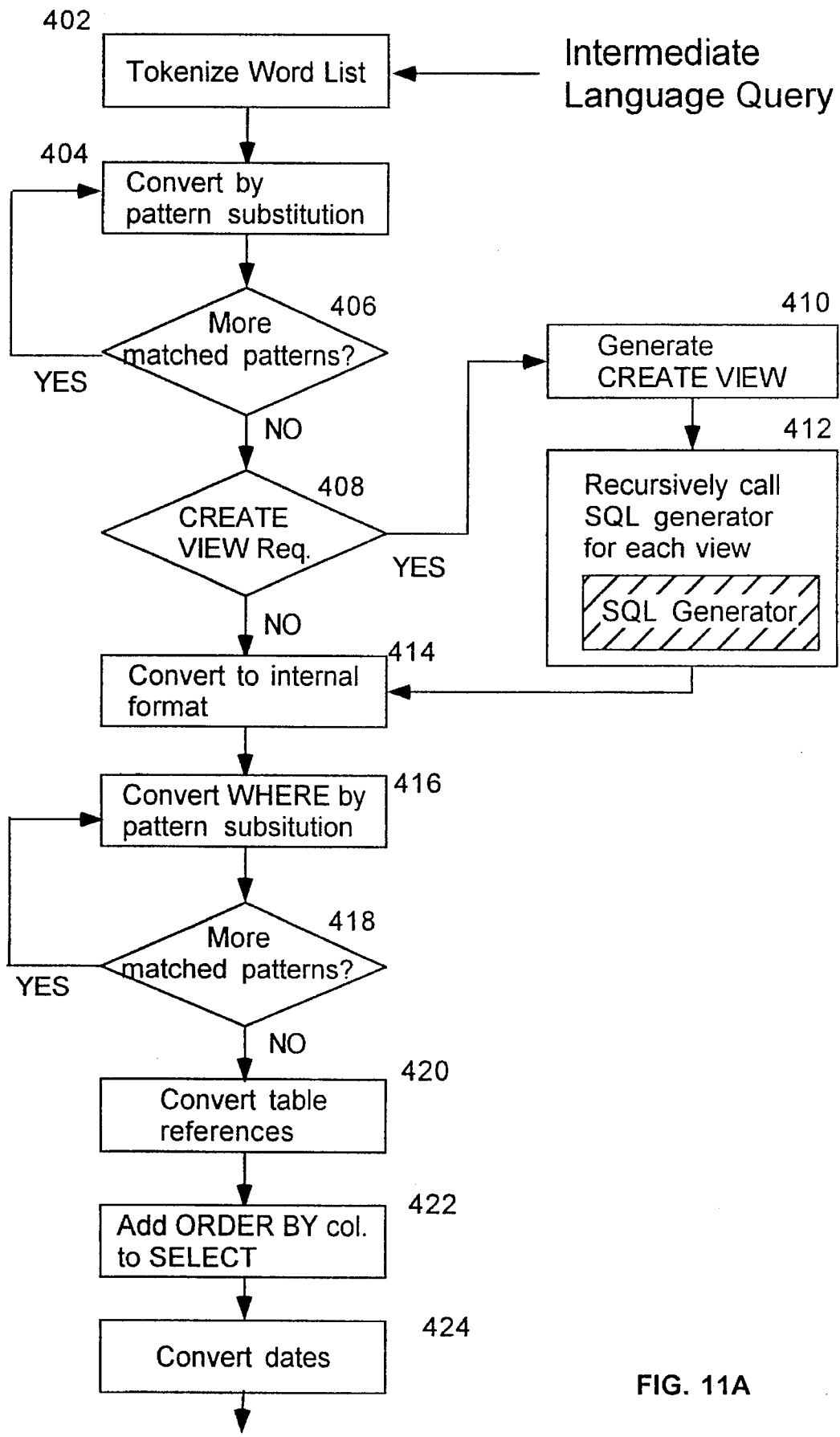
FIGS. 11A and 11B are a flow chart depicting the flow of control of the SQL Generator.
Figure 11B:
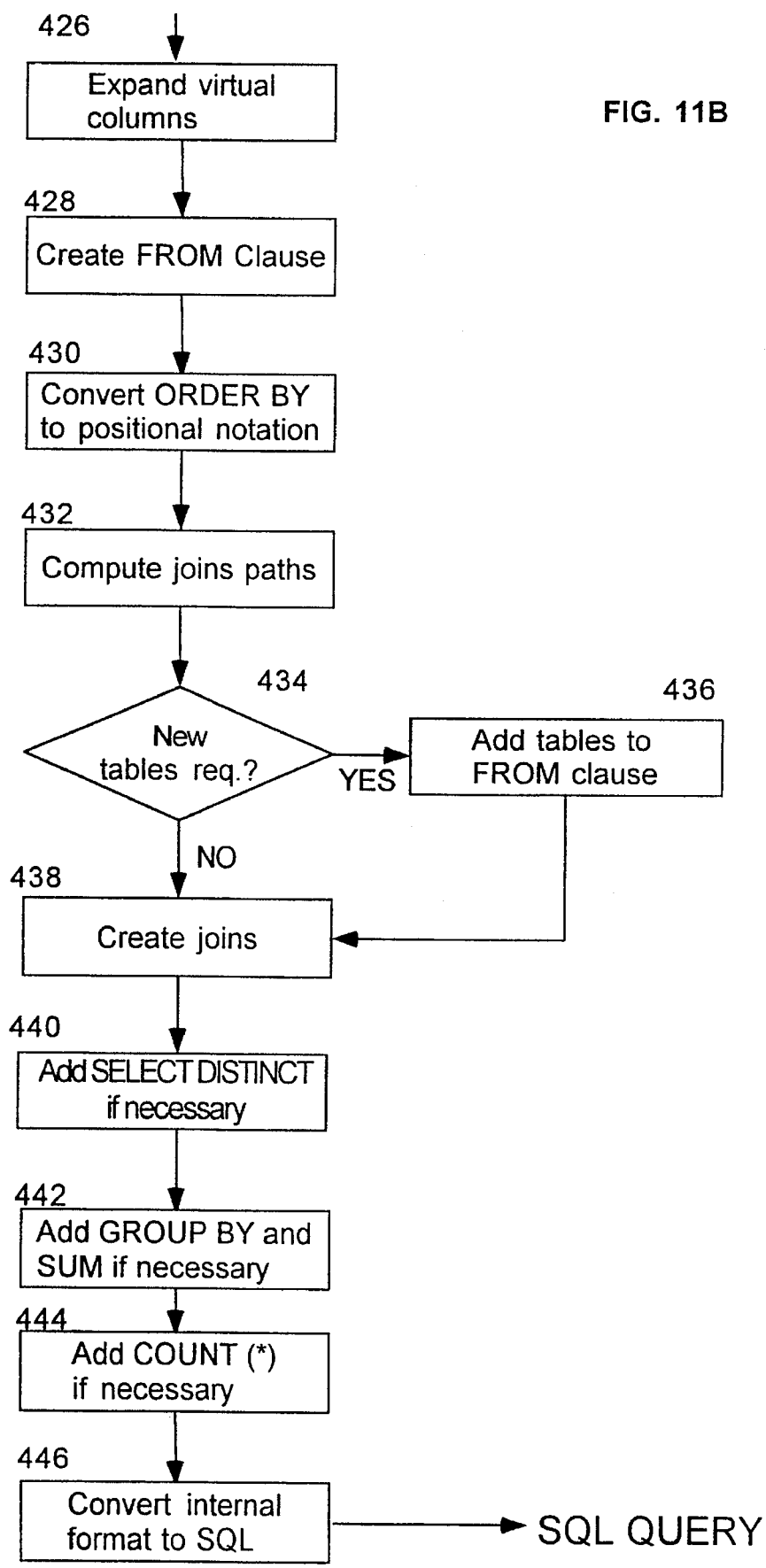

FIGS. 11A and 11B depict a flowchart of the flow of control of SQL Generator 20. Each of the steps is described in detail below. SQL Generator 20 applies a series of transformations to the intermediate language input to produce a resulting SQL statement. If one of these transformations fails, an error message will be displayed. An error message is only possible if the input query is not part of the intermediate language (i.e. was not, and could not be generated by Query Assistant 10). SQL Generator 20 takes as input an intermediate language query and produces an SQL statement as output by applying the steps described below.

In step 402, the intermediate language query is tokenized, i.e. convened to a list of structures. Each structure holds information about one token in the query. A token is usually a word, but can be a phrase. In this step, punctuation is eliminated, anything inside quotes is convened to a string, and an initial attempt is made to categorize each token.

In steps 404 and 406, the intermediate language query is converted to an internal lexical format. The conversion is done via successive pattern matching transformations. The clause is compared against a set of patterns until there are no more matched patterns. The lexical conversion pattern matcher is discussed in more detail below. The resulting internal format differs from the intermediate language format in several ways:

(a) Synonyms within the intermediate language for the same construct are resolved to a single consistent construct (i.e., "HAS" and "HAVE" become "HAVE").

(b) Synonyms for tables and columns are resolved, utilizing the names specified in the conceptual layer and by converting column names to fully qualified column names in the form of Table_Name. Column_Name (c) Dates are converted to a Julian date format (d) Extraneous commas and ANDs (except those in condition clauses) are deleted (e) Condition clauses are transformed to match one or more predefined WHERE clause patterns stored as ASCII text in an external file (f) Special symbol are inserted to demarcate the beginning and middle of "what percent of . . . ", "show. . . as a % of . . . ", and "compare . . . " queries.

(g) A special symbol is inserted to demarcate the object of every FOR clause.

(h) Certain words designated as Ignore words are eliminated. (i.e. The, That, etc.)

When no further patterns can be matched, control transfers to step 408, where it is determined whether CREATE VIEW statements are necessary. If so, in steps 410 and 412, SQL Generator 20 is called recursively as a subroutine to generate the required views. As the view is generated the recursive call to SQL Generator 20 is terminated. CREATE VIEW (an SQL construct) is required for queries in the intermediate language which call for percentage calculations or otherwise require two separate passes of the database (i.e. comparisons). The types of queries that Query Assistant 10 can produce that require a CREATE VIEW statement are of a predetermined finite set, and SQL Generator 20 includes the types of queries which require CREATE VIEW generation. An example type of query where it is required is "Compare X against Y" where X and Y are independent queries that produce numeric values. Within each recursive call to SQL Generator 20, pattern matching is conducted to resolve newly introduced items. Control then passes to step 414.

In step 414, the internal lexical format is converted into an internal SQL format, which is a set of data structures that more closely parallel the SQL language. The internal SQL format partitions the query into a sets of strings conforming to the various SQL statement elements including: SELECT columns. WHERE clauses, ORDER BY columns, GROUP columns, Having clause flag, FROM table/alias pairs, JOINs. In this step, the SELECT, and ORDER BY sections are populated, but WHERE clauses are maintained in lexical format for processing at the next step. The other elements are set in the following steps if necessary.

In the ensuing steps 416 and 418, the lexical WHERE phrases are compared with a set of patterns stored in an external ASCII text file. If a match is found, a substitution pattern found in the external file is used for representing the structure in an internal SQL format. In this way, the WHERE clause is transformed from the intermediate language to the internal SQL format equivalent.

If any table references have been introduced into the internal SQL structure as columns, they are converted to column references in step 420. This can occur on queries like "show customers". Virtual table references are also expanded in this step using the conceptual layer information to include the table name and the virtual table condition, if present, which is added to the internal structure.

If there are any columns in the ORDER BY clause that are not in the SELECT, they are added to the SELECT in step 422. In step 424, Julian dates are converted to dates specified in appropriate SQL syntax. Next, in step 426, virtual columns are expanded into the expressions defined in the conceptual layer by textual substitution. This is why virtual column expressions are defined according to SQL expressions or other expressions understood by the DBMS. In this step, the expression of a virtual column will be added to the WHERE clause—a Lookup command will simply mac another join condition in the WHERE clause.

In step 428, the FROM clause of the SQL statement is created by assigning aliases for each table in the SELECT and WHERE clauses, but ignoring subqueries that are defined during the pattern matching of steps 416 and 418. In step 430, the ORDER BY clause is converted from column names to positional references. Some SQL implementations will not accept column names in the ORDER BY clause—they require the column's position in the SELECT clause (i.e. 1, 2 etc.). This step replaces the column names in the ORDER BY clauses with their respective column order numbers.

In step 432, the navigation path is computed for required joins. This is done using a minimal spanning tree as described above. This is a technique commonly used for finding the shortest join path between two tables, but other techniques will work equally well. If additional tables are required then they are added. Also, by default, the shortest join path is created. However, if the user designated a different join path which was predefined by the administrator and put in the conceptual layer, that path is used. If it is determined in step 434 that new tables are required, they are added in step 436 to the FROM clause. Then, in step 438, the WHERE clause join statements are created in the internal SQL structure.

In step 440, SELECT is converted to SELECT DISTINCT, if necessary. This is required if the query does not include the primary key in the Show clause of the query and there are only non-numeric columns (i.e. "Show Customer State and Customer City"). The primary keys are defined as Customer Number and Customer Name in the CUSTOMERS table. SELECT DISTINCT will limit the query to distinct sets and will group the results by columns in the order listed. Using SELECT alone will result in one output line for every row in the table.

In step 442, the GROUP BY clause is added to internal SQL (if necessary), as are any inferred SUMs. This is required if the query does not include the primary key in the Show clause of the query and there are numeric columns (i.e. "Show Customer State and Customer Balance"). The primary key is the Customer Number in the CUSTOMERS table and here Customer Balance is a numeric field. What the user wants is to see the balance by state. Without including Group By and SUM, there will be a resulting line for every row in the CUSTOMERS table. This step places any numeric fields in SUM expression and places all non-numeric fields in a GROUP BY clause. For example, the above query would produce the following SQL.

```
(5)    SELECT T1.STATE, SUM (T1.BALANCE)
       FROM CUSTOMERS T1
       GROUP BY T1.STATE
```

In step 444, COUNTs are converted to COUNT (*), if necessary. This is required, as an SQL convention, where the user requests a count on a table. For example, the query "Show The Count of Customers" produces the SQL code

```
(6)    SELECT COUNT (*)
       FROM CUSTOMERS T1
```

Finally, in step 446, the internal SQL format is converted into textual SQL by passing it through a simple parser.

B. Pattern Matching

Steps 404 and 416 transform the intermediate language query using pattern matching and substitution techniques. These steps help to define the intermediate language more then any other steps. By modifying these pattern/substitution pairs the intermediate language could take on a different look and feel using different phrases. Accordingly, Query Assistant 10 would need to be able to produce those phrases. Further, by adding patterns, the user can be given more ways of entering similar concepts (when not using Query Assistant 10), and more types of subqueries can be defined. For every new type of subquery defined as a pattern, the Where clause generation function of Query Assistant 10 would need to be modified to provide the capability.

Two types of patterns used in SQL Generator 20. The first, used in step 404, is a simple substitution, while the second, used in converting Where clauses in step 416, is more complex because it can introduce new constructs and subqueries.

1. Lexical conversion pattern matching

In the lexical conversion pattern matching of step 404, a text string of the query is compared to a pattern, and if a substring of the query matches a pattern, the substring is replaced with the associated substitution string. Patterns take the form of:

PRIORITY SUBSTITUTION<-PATTERN

PRIORITY is a priority order for the patterns which takes the form of #PRIORITY-? with ? being a whole number greater then or equal to 0. This provides an order for the pattern marcher with all #PRIORITY-0 patterns being processed before #PRIORITY-1 patterns and so on. Within a given priority, the patterns are applied in order listed. If the pattern does not begin with a priority, it has the same priority as the most recently read pattern (i.e. all patterns have the same priority until the next priority designation)

PATTERN is what is compared against the query to find a match. Textual elements which match directly with words in the query along with the following key symbols:

| | |
|---|---|
| { } | or |
| [ ] | a single phrase |
| ~ | optional |
| !???x | variable that matches anything, x is a number. |
| !ENTx | table variable which matches any table name, x is a number in case of multiple tables in the pattern. |
| !ATTx | column variable which matches any column name, x is a number in case of multiple columns in the pattern. |
| !VALx | value variable which matches any numeric value, x is a number for multiple values in the pattern. |
| !FUNCTIONx | function variable which matches a function that can be applied to a column (i.e. SUM, AVG, etc.), x is a number for multiple functions in the pattern. |

SUBSTITUTION is the replacement text. Every, instance of !???, !ENTx, !ATTx, or !VALx is replaced with the table, column or value bound to the variable in the PATTERN.

As an example, the pattern "PRIORITY-0 AND THAT HAVE <- {[AND HAVE] [AND HAS]}" indicates that the phrases "AND HAVE" and "AND HAS" are synonyms for the phrase "AND THAT HAVE" and will be accordingly substituted. The brackets signify phrases. The braces signify multiple synonyms. The "#PRIORITY-0" entries define the pattern as having a priority of 0 so that this rule would apply before any priority 1 rules. etc.

Another example pattern is "(!ATT1>=!???1 and !ATT1<=!???2)<- {[!ATT1 BETWEEN !???1 AND !???2] [!ATT1 FROM !???1 TO !???2]}". In this case the pattern would match substrings of the form of "BALANCE BETWEEN 10000 AND 50000" or "BALANCE FROM 10000 TO 50000" and would substitute it with "BALANCE >=10000 AND BALANCE<=50000". As is evident from the form of the patterns, the intermediate language which is understandable to the SQL Generator can be simply varied by changing these patterns or adding new patterns to recognize different words or phrases.

The set of patterns used in step 404 of the illustrated embodiment (i.e., for one instance of an intermediate language) is shown below.

Pattern 501
PRIORITY-0 AND THAT HAVE <— {[AND HAVE][AND HAS]}
Pattern 502
PRIORITY-0 AND THAT DO NOT HAVE <— {[AND DO NOT HAVE][AND DOES NOT HAVE]}
Pattern 503
PRIORITY-0 WHERE NOT <— {WITHOUT [THAT DO NOT HAVE][THAT DOES NOT HAVE]}
Pattern 504
PRIORITY-0 HAVE NOT <— {[DO NOT HAVE][DOES NOT HAVE]}
Pattern 505
PRIORITY-2 !ENT1, !ENT2 <— [!ENT1 !ENT2]
Pattern 506
PRIORITY-5 !ENT1 , !ATT1 <— [!ENT1 !ATT1]
Pattern 507
PRIORITY-0 PCT_TOTAL <— [WITH {% PERCENT PERCENTAGE} OF TOTAL ]
Pattern 508
PRIORITY-0 !ATT1 PCT_TOTAL <—
            [!ATT1 WITH {% PERCENT PERCENTAGE} OF TOTAL SUBTOTAL]
Pattern 509
PRIORITY-0 WHAT_PERCENT_BEGIN <— [WHAT {% PERCENT PERCENTAGE} ~ OF[
Pattern 510
PRIORITY-0 AS_PCT_MIDDLE <— [AS A {% PERCENT PERCENTAGE} OF]
Pattern 511
PRIORITY-0 COMPARE_BEGIN <— COMPARE
Pattern 512
PRIORITY-2 OFENTITY!! !ENT1 WHERE
    <— [FOR {[!ENT1 THAT HAVE]
        [!ENT1 THAT HAS]
        [!ENT1 CANTFOLLOW XDATE]}]
Pattern 513
PRIORITY-2 OFENTITY!! "ENT1 WHERE <— {[WHERE !ENT1 HAVE][WHERE !ENT1 HAS]}
Pattern 514
PRIORITY-2 !ATT1 = !VAL1 <— [!ATT1 = "!VAL1 "]
Pattern 515
PRIORITY-2 XDATE MTH !MTH1 ENDPT <— !MTH1
Pattern 516
PRIORITY-2 XDATE MTH !VAL1 DAY !VAL2 CYR !VAL3 ENDPT <— [!VAL1/!VAL2/!VAL3]
Pattern 517
PRIORITY-2 XDATE MTH XDATE MTH !MTH1 DAY !VAL1 CYR !VAL2 ENDPT <— [!MTH1 !VAL1 ~, !VAL2]
Pattern 518
PRIORITY-2 XDATE MTH !MTH1 CYR !VAL1 ENDPT <— [!MTH1 ~, !VAL1]
Pattern 519
PRIORITY-2 XDATE XDATE RDAY 0 ENDPT <— TODAY
Pattern 520
PRIORITY-2 XDATE RDAY -1 ENDPT <— YESTERDAY
Pattern 521
PRIORITY-2 XDATE RWEEK 0 ENDPT <— [THIS WEEK]
Pattern 522
PRIORITY-2 XDATE RWEEK -1 ENDPT <— [LAST WEEK]
Pattern 523
PRIORITY-2 XDATE RMTH 0 ENDPT <— {[THIS MONTH] MTD}
Pattern 524
PRIORITY-2 XDATE RMTH -1 ENDPT <—[LAST MONTH]
Pattern 525
PRIORITY-2 XDATE RCYR 0 ENDPT <—{[THIS YEAR ] YTD}
Pattern 526
PRIORITY-2 XDATE ROTR 0 ENDPT <—[THIS QUARTER]
Pattern 527
PRIORITY-2 XDATE RQTR -1 ENDPT <— [LAST QUARTER]
Pattern 528
PRIORITY-2 XDATE RQTR - !VAL1 ENDPT <— [!VAL1 QUARTERS AGO]
Pattern 529
PRIORITY-2 XDATE RQTR - !VAL1 POINT2 RQTR -1 ENDPT <— [LAST !VAL1 QUARTERS]
Pattern 530
PRIORITY-2 XDATE RCYR -1 ENDPT <— [LAST YEAR]
Pattern 531
PRIORITY-2 XDATE RDAY - !VAL1 ENDPT <— [!VAL1 DAYS AGO]
Pattern 532
PRIORITY-2 XDATE RDAY - !VAL1 POINT2 RDAY -1 ENDPT <— [LAST !VAL1 DAYS]
Pattern 533
PRIORITY-2 XDATE RWEEK - !VAL1 ENDPT <— [!VAL1 WEEKS AGO]
Pattern 534
PRIORITY-2 XDATE RWEEK - !VAL1 POINT2 RWEEK -1 ENDPT <—[LAST !VAL1 WEEKS]
Pattern 535
PRIORITY-2 XDATE RMTH - !VAL1 ENDPT — [!VAL1 MONTHS AGO]
Pattern 536
PRIORITY-2 XDATE RMTH - !VAL1 POINT2 RMTH -1 ENDPT <—[LAST !VAL1 MONTHS]
Pattern 537
PRIORITY-2 XDATE RCYR - !VAL1 ENDPT <—[!VAL1 YEARS AGO]
Pattern 538
PRIORITY-2 XDATE RCYR - !VAL1 POINT2 RCYR -1 ENDPT <— [LAST !VAL1 YEARS]

Pattern 539
PRIORITY-2 !ATT1 XDATE !VAL1 −1 <— [!ATT1 >= XDATE !VAL1 !VAL2]
Pattern 540
PRIORITY-2 !ATT1 XDATE !VAL1 −1 <— [!ATT1 {SINCE >} XDATE !VAL1 !VAL2]
Pattern 541
PRIORITY-2 !ATT1 XDATE −1 !VAL1 <— [!ATT1 <= XDATE !VAL1 !VAL2]
Pattern 542
PRIORITY-2 !ATT1 XDATE −1 !VAL1 <— [!ATT1 {BEFORE <} XDATE !VAL1 !VAL2]
Pattern 543
PRIORITY-2 !ATT1 XDATE !VAL1 !VAL2 <— [!ATT1 = XDATE !VAL1 !VAL2]
Pattern 544
PRIORITY-2 !ATT1 XDATE !VAL1 !VAL4
    <— {[!ATT1 BETWEEN XDATE !VAL1 !VAL2 AND XDATE !VAL3 !VAL4]
    !ATT1 FROM XDATE !VAL1 !VAL2 TO XDATE !VAL3 !VAL4
Pattern 545
PRIORITY-2 SUM <— {TOTAL [SUM OF]}
Pattern 546
PRIORITY-2 COUNT<— [HOW MANY]
Pattern 547
PRIORITY-2 AVG <— {AVERAGE AVE}
Pattern 548
PRIORITY-2 MIN <— MINIMUM
Pattern 549
PRIORITY-2 MAX <— MAXIMUM
Pattern 550
PRIORITY-2 !!FUNCTION (!ATT1) <— [!!FUNCTION !ATT1]
Pattern 551
PRIORITY-1 SELECT COUNT <— [COUNT FIRSTWORD]
Pattern 552
PRIORITY-2 !!FUNCTION1 (!!FUNCTION2 (!ATT1))
    <— {[(!!FUNCTION1 !!FUNCTION2 !ATT1]
    [!ATT1 !!FUNCTION1 !!FUNCTION2]}
Pattern 553
PRIORITY-0 SELECT COUNT <— [COUNT FIRSTWORD]
Pattern 554
PRIORITY-2 COUNT (DISTINCT!ATT1) <— [COUNT !ATT1]
Pattern 555
PRIORITY-2 COUNT (!ENT1) <— [COUNT !ENT1]
Pattern 556
!ENT1 WHERE <—[!ENT1 {FOR [THAT HAVE][THAT HAS] HAVING}]
Pattern 557
PRIORITY-2 !ATT1 WHERE !ATT1 <— [WHERE !ATT1 WHERE !ATT1]
Pattern 558
PRIORITY-2 WHERE !ATT1 <— [WHERE !ATT1 WHERE]
Pattern 559
PRIORITY-2 !ENT1 WHERE <— [!ENT1 THAT {HAVE HAS}]
Pattern 560
PRIORITY-2 (!ATT1 >= !???1 AND !ATT1 <= !???2) <—
    {[!ATT1 BETWEEN !???1 AND !???2) <—
    [!ATT1 FROM !???1 TO !???2]}
Pattern 561
PRIORITY-2 SELECT <— [{WHERE IS DO AM WERE ARE WAS WILL HAD HAS HAVE DID
DOES CAN I LIST SHOW GIVE PRINT DISPLAY OUTPUT FORMAT PLEASE RETRIEVE
CHOOSE FIND GET LOCATE COMPUTE CALCULATE HOW WHOSE DO WHAT WHO WHEN
HOW WHOSE [WHAT {IS ARE}]} FIRSTWORD]
Pattern 562
NOT NULL <—{[IS NOT NULL][IS NOT BLANK]
Pattern 563
NULL <— [IS BLANK]
Pattern 564
=<— IS
Pattern 565
PRIORITY-2 <><— {NEQ!= [NOT EQUAL ~TO]}
Pattern 566
><— {OVER GREATER [GREATER THAN][MORE THAN] ABOVE
    [NOT LESS THAN OR EQUAL ~ TO]}
Pattern 567
PRIORITY-2 >= <— {[GREATER THAN OR EQUAL ~ TO][GT OR EQ ~TO[]AT LEAST] =>
[NOT LESS THAN[]GTE ~ TO[]MORE THAN OR EQUAL ~ TO]}
Pattern 568
PRIORITY-2 < <—{[LESS [LESS THAN] I BELOW UNDER [NOT MORE THAN OR EQUAL ~ TO]
}
Pattern 569
PRIORITY-2 <= <— {[LESS THAN OR EQUAL ~ TO][LT OR EQ ~ TO][AT MOST] =<
[NOT MORE THAN][LTE ~ TO]}
Pattern 570
PRIORITY-2 = <— {[EQUAL ~ TO]}
Pattern 571
ORDERBY <— [~ AND {BY [SORTED BY]}]
Pattern 572

```
#PRIORITY-5 ORDERBY <— [ORDER BY]
Pattern 573
#PRIORITY-0 DESC <— {(DESCENDING [IN {DECREASING DESCENDING} ORDER]}
Pattern 574
#PRIORITY-0 ASC <— {ASCENDING [IN {INCREASING ASCENDING} ORDER[}
Pattern 575
#PRIORITY-0 THATBEGINWITH !?? <— [BEGINS WITH !???]
Pattern 576
#PRIORITY-0 THATENDWITH !??? <— [ENDS WITH !???]
Pattern 577
#PRIORITY-0 THATCONTAIN !??? <— [CONTAINS !???]
Pattern 578
#PRIORITY-0 THATSOUNDLIKE !??? <— [~ THAT SOUNDS LIKE !???]
Pattern 579
HAVE <— HAS
Pattern 580
#PRIORITY-5 WHERE <— {HAVING [THAT HAVE]|THAT HAS]}
Pattern 581
#PRIORITY-5 >= 1 <— [{FOR OF}{ANY SOME}]
Pattern 582
#PRIORITY-5 SELECT <— [SELECT EVERY]
Pattern 583
#PRIORITY-2 !ENT1 WHERE EVERY <— [!ENT1 EVERY]
Pattern 584
EVERY <— {ALL EACH}
Pattern 585
!ENT1 WHERE <— [!ENT1 {ARE FOR WITH WHICH HAVE [THAT HAVE]|THAT HAS] HAVING}
Pattern 586
#PRIORITY-2 !ATT1 EVERY !ENT1 <— [EVERY !ATT1 ~ OFENTITY!! !ENT1]
Pattern 587
>= <— {SINCE FOLLOWING AFTER}
Pattern 588
<= <— {BEFORE|PRIOR TO|PRECEEDING}
Pattern 589
#PRIORITY-2 WHERE <— [WHERE WHERE]
```

When SQL Generator 20 is initiated, the patterns above are read from an external text file. The patterns are stored in a structure which, for each pattern, contains a priority, the pattern as a text string, and the substitution as a text string. Construction and operation of binding pattern matchers are well known in the art and any of the many techniques that provide the aforementioned capabilities is within the scope of this invention.

2. Conversion of lexical WHERE to internal SQL format

In step 416, a set of patterns is used to convert the Where clause of a query into SQL. These patterns help expand the type of queries the intermediate language can handle, and often map to SQL structures which require subqueries. By adding additional patterns, the intermediate language can be expanded to represent more types of complex SQL queries.

Similarly to the prior pattern matching step, this step compares a text string of the Where clause of a query against a pattern. The Where clause is compared from left to right with the patterns. When there is a match, the matched substring is removed from the Where clause string, and the internal SQL format is supplemented according to the defined substitution. This proceeds until the Where clause string is empty. Patterns are applied in a pre-specified order. Patterns take the form of:

PATTERN[ ] SUBSTITUTION **

PATTERNS are similar to those in the prior pattern matcher accept that, since there has already been a pass through the prior pattern matcher, there is no need for the { } symbols or the [ ] phrase symbols. Here, [ ] and ** are simply symbols used to mark the different portions of the pattern and replacement. In addition to the !???x, !ENTx, !ATTx, !VALx, and !FUNCTIONx binding variables, there are also !!NUM_CONSTRx which are numeric constraint variables that match any numeric constraint (i.e. >, <, <=, >=, <>), and NUM_ATTx which match numeric columns.

SUBSTITUTION contains the elements to be added to the internal SQL structure, including SELECT tables, FROM table/alias pairs, WHERE clauses, JOINs. There are also several keywords used in the substitution section.

BIND !ENTx The pattern matcher successively matches the Where clause string against the patterns removing portions that have been matched and then matching the remainder. This binds the table held in the binding variable !ENTx to the variable LAST-ENTITY for use in matching the rest of the Where string.

LAST-ENTITY This contains the last table found in the most recently matched pattern prior to the current pattern match. Thus, this is the last table that is matched in the last pattern that was matched. A pattern can set what the LAST-ENTITY will be for the next matched pattern by using the BIND command. At the start of the pattern matcher, it is set to the last table processed by the SQL generator.

ADD_TO_SELECT !ATTx or !NUM_ATTx This specifies to add the column in the !ATTx or !NUM_ATTx variable to the SELECT clause of the internal SQL representation.

!ALIASx In SQL, the FROM clause defines the table from which information comes, and if there is more than one table it generally requires that an alias be assigned to the table for use by the other clauses. The general convention is for an alias to be of the form Tx where x is a number. For example a FROM clause will typically have the format "FROM Customer T1, Order T2" where T1 and T2 are aliases. The SELECT clause may then have the format "SELECT NAME.T1, ORDER_DOLLAR.T2". This prevents confusion if columns from different tables have the same names.

When !ALIASx is encountered in the substitution, an alias is generated for storage in the SQL structure. Since there are generally multiple aliases, x is a number. For each different x, a different alias is generated.

PKT !ENTx This returns either the table in !ENTx or the base table if !ENTx contains a virtual table defined in the conceptual layer.

PK !ENTx This returns the Primary Key of the table in !ENTx variable.

COL At this stage, columns stored in !ATTx and !NUM_ATTx variables are fully qualified in the form of table.column. COL !ATTx returns the column portion.

TABLE TABLE !ATTx or !NUM_ATTx returns the table portion of the fully qualified column name.

As an example, refer to the following pattern:

```
/* customers with orders of any product */
1   !ENT1 >= 1 !ENT2 [ ]
2   FROM PKT LAST-ENTITY !ALIAS1
3   WHERE EXISTS
4      SELECT*
5      FROM PKT!ENT2 !ALIAS2
6      WHERE EXISTS
7         SELECT *
8         FROM PKT !ENT1 !ALIAS3
9         JOIN !ENT2 !ALIAS2
10        JOIN LAST-ENTITY !ALIAS1
11 BIND !ENT2 **
```

Line 1 contains the pattern to match—it will match a string containing "Table_ref1 >=1 Table_ref2" where the table_refs are names of tables or virtual tables stored in the conceptual layer. The string is put in this format during the prior pattern matching and substitution in step 404. Line 2 creates a FROM statement with the base table of the last table referenced by SQL Generator 20 before matching this pattern and create an alias. Line 5 creates a FROM clause with the base table of !ENT2 with an alias distinct from the prior alias. Line 8 is similar to lines 2 and 5. Lines 9 and 10 specify the Joins in internal SQL that will be required. The tables specified in lines 8 and 9 with their respective aliases need to be joined to the table specified in the FROM clause in line 8. Finally, in line 11, !ENT2 is bound as the LAST-ENTITY for any further pattern matching.

Therefore, if the clause being matched contains "ORDERS>=1 PRODUCTS" and the last table referenced as stored in LAST-ENTITY is CUSTOMERS, the resulting internal SQL format would contain:

```
FROM CUSTOMERS T1
WHERE EXISTS
   SELECT*
   FROM PRODUCTS T2
   WHERE EXISTS
      SELECT*
      FROM ORDERS T3
      JOIN PRODUCTS T2
      JOIN CUSTOMERS T1
BIND PRODUCTS**
```

The set of patterns employed in step 416 of the illustrated embodiment (i.e., for one instance of an intermediate language) is shown below.

```
        FROM CUSTOMERS T1
        WHERE EXISTS
            SELECT *
            FROM PRODUCTS T2
            WHERE EXISTS
                SELECT *
                FROM ORDERS T3
                JOIN PRODUCTS T2
                JOIN CUSTOMERS T1
        BIND PRODUCTS **
```

Pattern 601
/* order date = january 1, 1993 */
!ATT1 XDATE !VAL1 !VAL2 []
FROM TABLE !ATT1 !ALIAS1
WHERE !ALIAS1 . COL !ATT1 XDATE !VAL1 !VAL2 **

Pattern 602
/* balance between 100 and 500 */
!NUM-ATT1 BETWEEN !VAL1 AND !VAL2 []
FROM TABLE !NUM-ATT1 !ALIAS1
WHERE !ALIAS1 . COL !NUM-ATT1 BETWEEN !VAL1 AND !VAL2 **

Pattern 603
/* balance > 500 */
!NUM-ATT1 !NUM-CONSTR1 !VAL1 []
FROM TABLE !NUM-ATT1 !ALIAS1
WHERE !ALIAS1 . COL !NUM-ATT1 !NUM-CONSTR1 !VAL1 **

Pattern 604
/* customers with orders of every product */
!ENT1 WHERE EVERY !ENT2 []
FROM PKT LAST-ENTITY !ALIAS1
WHERE NOT EXISTS
    SELECT *
    FROM PKT !ENT2 !ALIAS2
    WHERE NOT EXISTS
        SELECT *
        FROM PKT !ENT1 !ALIAS3
        JOIN !ENT2 !ALIAS2
    JOIN LAST-ENTITY !ALIAS1
BIND !ENT1 **

Pattern 605
/* customers with orders of any product */
!ENT1 >= 1 !ENT2 []
FROM PKT LAST-ENTITY !ALIAS1
WHERE EXISTS
    SELECT *
    FROM PKT !ENT2 !ALIAS2
    WHERE EXISTS
        SELECT *
        FROM PKT !ENT1 !ALIAS3
        JOIN !ENT2 !ALIAS2
        JOIN LAST-ENTITY !ALIAS1
BIND !ENT2 **

Pattern 606
/* salesmen that have at least 1 order */
>= 1 !ENT1 []
FROM PKT LAST-ENTITY !ALIAS1
WHERE EXISTS
    SELECT *
    FROM PKT !ENT1 !ALIAS2
    JOIN LAST-ENTITY !ALIAS1
            BIND !ENT1 **

Pattern 607
/* salesmen that have at least 2 orders */
!NUM-CONSTR1 !VAL1 !ENT1 []
FROM PKT LAST-ENTITY !ALIAS1
WHERE REVERSE !NUM-CONSTR1 !VAL1
    SELECT COUNT (*)
    FROM PKT !ENT1 !ALIAS2
    JOIN LAST-ENTITY !ALIAS1
            BIND !ENT1 **

Pattern 608
/* customers that have every order_date since january 1 */
EVERY !ATT1 XDATE !VAL1 !VAL2 []
FROM PKT LAST-ENTITY !ALIAS1
WHERE NOT EXISTS
    SELECT *
    FROM TABLE !ATT1 !ALIAS2
    JOIN LAST-ENTITY !ALIAS1
    WHERE NOT !ALIAS2 . COL !ATT1 XDATE !VAL1 !VAL2 **

Pattern 609
/* salesmen that have every order_amount between 10 and 50 */
EVERY !ATT1 BETWEEN !VAL1 AND !VAL2 []
FROM PKT LAST-ENTITY !ALIAS1
WHERE NOT EXISTS
    SELECT *
    FROM TABLE !ATT1 !ALIAS2
    JOIN LAST-ENTITY !ALIAS1
    WHERE !ALIAS2 . COL !ATT1 NOT BETWEEN !VAL1 AND !VAL2 **

Pattern 610
/* salesmen that have every order_amount > 50 */
EVERY !ATT1 !NUM-CONSTR1 !VAL1 []
FROM PKT LAST-ENTITY !ALIAS1
WHERE NOT EXISTS
    SELECT *
    FROM TABLE !ATT1 !ALIAS2
    JOIN LAST-ENTITY !ALIAS1
    WHERE !ALIAS2 . COL !ATT1 REVERSE-PROPER !NUM-CONSTR1 !VAL1 **

Pattern 611
/* salesmen that have every cust_name that
* sounds like smith */
EVERY !ATT1 THATSOUNDLIKE !??? []
FROM PKT LAST-ENTITY !ALIAS1
WHERE NOT EXISTS
    SELECT *
    FROM TABLE !ATT1 !ALIAS2
    JOIN LAST-ENTITY !ALIAS1
    WHERE SOUNDEX ( !ALIAS2 . COL !ATT1 )
        <> SOUNDEX ( ' NOSPACESON !??? ' NOSPACESOFF ) **

Pattern 612
/* salesmen that have every cname that contains s */
EVERY !ATT1 THATCONTAIN !??? []
FROM PKT LAST-ENTITY !ALIAS1
WHERE NOT EXISTS
    SELECT *
    FROM TABLE !ATT1 !ALIAS2
    JOIN LAST-ENTITY !ALIAS1
    WHERE NOT !ALIAS2 . COL !ATT1 LIKE ' NOSPACESON %
        !??? % ' NOSPACESOFF **

Pattern 613
/* salesmen that have every cname that begins with s */
EVERY !ATT1 THATBEGINWITH !??? []
FROM PKT LAST-ENTITY !ALIAS1
WHERE NOT EXISTS
    SELECT *
    FROM TABLE !ATT1 !ALIAS2
    JOIN LAST-ENTITY !ALIAS1
    WHERE NOT !ALIAS2 . COL !ATT1 LIKE ' NOSPACESON !??? % '
        NOSPACESOFF **

Pattern 614
/* salesmen that have every cname that ends with s */
EVERY !ATT1 THATENDWITH !??? []
FROM PKT LAST-ENTITY !ALIAS1
WHERE NOT EXISTS
    SELECT *
    FROM TABLE !ATT1 !ALIAS2
    JOIN LAST-ENTITY !ALIAS1
    WHERE NOT !ALIAS2 . COL !ATT1 LIKE ' NOSPACESON % !??? '
        NOSPACESOFF **

Pattern 615
/* salesmen that have every cname = smith */
EVERY !ATT1 = !??? []
FROM PKT LAST-ENTITY !ALIAS1
5   WHERE NOT EXISTS
        SELECT *
        FROM TABLE !ATT1 !ALIAS2
        JOIN LAST-ENTITY !ALIAS1
        WHERE !ALIAS2 . COL !ATT1 <> ' NOSPACESON !??? '
10          NOSPACESOFF **

Pattern 616
/* every order where state = ct */
EVERY !ENT1 WHERE []
15  FROM PKT LAST-ENTITY !ALIAS1
    WHERE NOT EXISTS
        SELECT *
        FROM PKT !ENT1 !ALIAS2
        JOIN LAST-ENTITY !ALIAS1
20  BIND !ENT1 **

Pattern 617
/* salary > salary of at least 1 employee */
!NUM-ATT1 !NUM-CONSTR1 !NUM-ATT2 >= 1 !ENT1 []
25  FROM TABLE !NUM-ATT1 !ALIAS1
    WHERE ANY
        SELECT *
        FROM TABLE !NUM-ATT2 !ALIAS2
        WHERE !ALIAS1 . COL !NUM-ATT1 >
30          !ALIAS2 . COL !NUM-ATT2
                    BIND !ENT1 **

Pattern 618
/* salary > salary of at least 6 employees */
35  !NUM-ATT1 !NUM-CONSTR1 !NUM-ATT2 !NUM-CONSTR2 !VAL1 !ENT1 []
    FROM TABLE !NUM-ATT1 !ALIAS1
    WHERE REVERSE !NUM-CONSTR2 !VAL1
            SELECT COUNT (*)
            FROM TABLE !NUM-ATT2 !ALIAS2
40          WHERE !ALIAS1 . COL !NUM-ATT1 !NUM-CONSTR1
            !ALIAS2 . COL !NUM-ATT2
                    BIND !ENT1 **

Pattern 619
45  /* salary > salary of the manager of that employee */
    !NUM-ATT1 !NUM-CONSTR1 !NUM-ATT2 !ATT1 !ENT1 []
    FROM TABLE !NUM-ATT1 !ALIAS1
    WHERE !NUM-ATT1 !NUM-CONSTR1 ALL
            SELECT !NUM-ATT2
50          FROM TABLE !NUM-ATT2 !ALIAS2
            WHERE !ALIAS1 . COL !ATT1 = !ALIAS2 . PK !ENT1
                    BIND !ENT1 **

Pattern 620
55  /* salary > salary of employees [having name='smith'] */
    !NUM-ATT1 !NUM-CONSTR1 !NUM-ATT2 WHERE []
    FROM TABLE !NUM-ATT1 !ALIAS1
    WHERE !NUM-ATT1 !NUM-CONSTR1 ALL
            SELECT !NUM-ATT2
60          FROM TABLE !NUM-ATT2 !ALIAS2 **

Pattern 621
/* salary > salary employees [having name='smith'] */
!NUM-ATT1 !NUM-CONSTR1 !NUM-ATT2 !ENT1 []
FROM TABLE !NUM-ATT1 !ALIAS1
WHERE !NUM-ATT1 !NUM-CONSTR1 ALL
    SELECT !NUM-ATT2
    FROM TABLE !NUM-ATT2 !ALIAS2
    BIND !ENT1 **

Pattern 622
/* salary > salary of every employee [having state=ct] */
!NUM-ATT1 !NUM-CONSTR1 !NUM-ATT2 EVERY !ENT1 []
FROM TABLE !NUM-ATT1 !ALIAS1
WHERE !NUM-ATT1 !NUM-CONSTR1 ALL
    SELECT !NUM-ATT2
    FROM TABLE !NUM-ATT2 !ALIAS2
    BIND !ENT1 **

Pattern 623
/* salary > average salary of employees [having name='smith'] */
!ATT1 !NUM-CONSTR1 !!FUNCTION1 ( !ATT2 ) !ENT1 []
FROM TABLE !ATT1 !ALIAS1
WHERE !ATT1 !NUM-CONSTR1
    SELECT !!FUNCTION1 ( !ATT2 )
    FROM TABLE !ATT2 !ALIAS2
    BIND !ENT1 **

Pattern 624
/* salary > average salary of all employees [having state = ct] */
!ATT1 !NUM-CONSTR1 !!FUNCTION1 ( !ATT2 ) EVERY !ENT1 []
FROM TABLE !ATT1 !ALIAS1
WHERE !ATT1 !NUM-CONSTR1
    SELECT !!FUNCTION1 ( !ATT2 )
    FROM TABLE !ATT2 !ALIAS2
    BIND !ENT1 **

Pattern 625
/* salesman that have the same state */
SAME !ATT1 []
FROM TABLE !ATT1 !ALIAS1
WHERE !ALIAS1 . COL !ATT1 IN
    SELECT !ATT1
    FROM TABLE !ATT1 !ALIAS2
    WHERE !ALIAS1 . PK LAST-ENTITY <>
    !ALIAS2 . PK LAST-ENTITY **

Pattern 626
/* salesmen that have no orders */
NO !ENT1 []
FROM PKT LAST-ENTITY !ALIAS1
WHERE NOT EXISTS
    SELECT *
    FROM PKT !ENT1 !ALIAS2
    JOIN LAST-ENTITY !ALIAS1
    BIND !ENT1 **

Pattern 627
/* balance > 500 */
!NUM-ATT1 !NUM-CONSTR1 !VAL1 []
FROM TABLE !NUM-ATT1 !ALIAS1
WHERE !ALIAS1 . COL !NUM-ATT1 !NUM-CONSTR1 !VAL1 **

Pattern 628
/* balance > credit limit */
!NUM-ATT1 !NUM-CONSTR1 !NUM-ATT2 []
FROM TABLE !NUM-ATT1 !ALIAS1
WHERE !NUM-ATT1 !NUM-CONSTR1 !NUM-ATT2 **

Pattern 629
/* balance > (credit limit * 10) */
!NUM-ATT1 !NUM-CONSTR1 !COMP1 []
FROM TABLE !NUM-ATT1 !ALIAS1
WHERE !NUM-ATT1 !NUM-CONSTR1 !COMP1 **

Pattern 630
/* (balance*5) > (credit limit * 10) */
!COMP1 !NUM-CONSTR1 !COMP2 []
WHERE !COMP1 !NUM-CONSTR1 !COMP2 **

Pattern 631
/* balance > sum(order$) */
!NUM-ATT1 !NUM-CONSTR1 !!FUNCTION1 ( !NUM-ATT2 ) []
FROM TABLE !NUM-ATT1 !ALIAS1
WHERE !NUM-ATT1 !NUM-CONSTR1 !!FUNCTION1 ( !NUM-ATT2 ) **

Pattern 632
/* sum(order$) > balance */
!!FUNCTION1 ( !NUM-ATT1 ) !NUM-CONSTR1 !NUM-ATT2 []
FROM TABLE !NUM-ATT1 !ALIAS1
WHERE !!FUNCTION1 ( !NUM-ATT1 ) !NUM-CONSTR1 !NUM-ATT2 **

Pattern 633
/* sum(order$) > avg(freight) */
!!FUNCTION1 ( !NUM-ATT1 ) !NUM-CONSTR1 !!FUNCTION2 ( !NUM-ATT2 ) []
FROM TABLE !NUM-ATT1 !ALIAS1
WHERE !!FUNCTION1 ( !NUM-ATT1 ) !NUM-CONSTR1 !!FUNCTION2
( !NUM-ATT2 ) **

Pattern 634
/* customer names that sound like ab */
!ATT1 THATSOUNDLIKE !??? TESTSOUNDEX []
FROM TABLE !ATT1 !ALIAS1
WHERE SOUNDEX ( !ATT1 )
= SOUNDEX ( ' NOSPACESON !??? ' NOSPACESOFF ) **

Pattern 635
/* customer names that contain ab */
!ATT1 THATCONTAIN !??? []
FROM TABLE !ATT1 !ALIAS1
WHERE !ALIAS1 . COL !ATT1 LIKE ' NOSPACESON % !??? % ' NOSPACESOFF **

Pattern 636
/* customer names that begin with ab */
!ATT1 THATBEGINWITH !??? []
FROM TABLE !ATT1 !ALIAS1
WHERE !ALIAS1 . COL !ATT1 LIKE ' NOSPACESON !??? % ' NOSPACESOFF **

Pattern 637
/* customer names that end with yz */
!ATT1 THATENDWITH !??? []
FROM TABLE !ATT1 !ALIAS1
WHERE !ALIAS1 . COL !ATT1 LIKE ' NOSPACESON % !??? ' NOSPACESOFF **

Pattern 638
/* cust.cnum = ord.cnum */
!ATT1 !NUM-CONSTR1 !ATT2 []
FROM TABLE !ATT1 !ALIAS1
WHERE !ATT1 !NUM-CONSTR1 !ATT2 **

Pattern 639
/* state = ct */
!ATT1 = !??? []
FROM TABLE !ATT1 !ALIAS1
WHERE !ALIAS1 . COL !ATT1 = ' NOSPACESON !???' NOSPACESOFF **

Pattern 640
/* ( ytd_sales - ytd_cost ) between 100 and 500 */
!COMP1 BETWEEN !VAL1 AND !VAL2 []
WHERE !COMP1 BETWEEN !VAL1 AND !VAL2 **

Pattern 641
/* ( ytd_sales - ytd_cost ) > 500 */
!COMP1 !NUM-CONSTR1 !VAL1 []
WHERE !COMP1 !NUM-CONSTR1 !VAL1 **

Pattern 642
/* customer number = 100 */
!ALPHA-ATT1 !NUM-CONSTR1 !VAL1 []
FROM TABLE !ALPHA-ATT1 !ALIAS1
WHERE !ALIAS1 . COL !ALPHA-ATT1 !NUM-CONSTR1 ' NOSPACESON !VAL1 '
NOSPACESOFF **

Pattern 643
/* customer names > aa */
!ATT1 !NUM-CONSTR1 !??? []
FROM TABLE !ATT1 !ALIAS1
WHERE !ALIAS1 . COL !ATT1 !NUM-CONSTR1 ' NOSPACESON !???' NOSPACESOFF **

Pattern 644
/* names that are null */
!ATT1 NULL []
FROM TABLE !ATT1 !ALIAS1
WHERE !ALIAS1 . COL !ATT1 IS NULL **

Pattern 645
/* names that are not null */
!ATT1 NOT NULL []
FROM TABLE !ATT1 !ALIAS1
WHERE NOT ( !ATT1 IS NULL ) **

Pattern 646
/* same as product 100 */
= !VAL1 []
WHERE PK LAST-ENTITY = !VAL1 **

Pattern 647
/* where salesman have */
!ENT1 WHERE []
BIND !ENT1 **

Pattern 648
/* of salesmen */
OF-ENTITY!! !ENT1 WHERE []
BIND !ENT1 **

When SQL Generator 20 is initiated, the patterns are read from an external text file. The patterns are stored in a structure which, for each pattern contains, the pattern string and the substitution string. Construction and operation of binding pattern marchers are well known in the art and any of the many techniques that provide the aforementioned capabilities is within the scope of this invention. The pattern marcher is recursively called when it encounters nested Where clauses in the case of parentheticals.

C. Join Path

Steps 432–436 call for the computation of join paths, the addition of any new tables to the FROM clause, and inclusion of the explicit joins in the WHERE clause. The computation of the join paths will produce the shortest join path between two tables unless the administrator has defined alternate join paths in the conceptual layer for the user to choose from. With a database structure as shown in FIG. 6, where the direction of the arrows show primary key ->foreign key relationships, the shortest join path can be readily computed as follows.

First, a table of primary key tables is constructed, foreign key tables following all primary key -> foreign key links, the next table in the join chain if not the foreign key table, and the number of joins it takes to get from the primary key table to the foreign key table. This table can be constructed using the foreign key information from the conceptual layer, or by querying the user as to the relationships among the tables.

Second, the navigable paths are computed for the tables to be joined by following the primary key -> foreign key pairs in the table. The Least Detailed Table (LDT) common to the primary key -> foreign key paths of the two tables to join is then found. The LDT is the table up on the graph. In a one-to-many relationship, the one is the least detailed table. If through multiple paths, there are multiple LDTs, the table where the sum of the number of joins is the least is selected. If the number of hops from table to table is equal, it is particularly appropriate for the administrator to define the join paths for user selection. If nothing is defined, one of the paths is arbitrarily chosen. Finally, the join path can be computed by following the primary key -> foreign key relations down to the LDT and then, if necessary, backwards following foreign key -> primary key back up to the second table of the join if neither table is the common LDT.

Using the above procedure, the following table can be constructed for the database of FIG. 6.

| Primary table | Foreign table | Next Table | Number of Joins |
| --- | --- | --- | --- |
| SALESPEOPLE | CUSTOMERS | | 1 |
| SALESPEOPLE | ORDERS | | 1 |
| SALESPEOPLE | LINE_ITEMS | ORDERS | 2 |
| CUSTOMERS | ORDERS | | 1 |
| CUSTOMERS | LINE_ITEMS | ORDERS | 2 |
| ORDERS | LINE_ITEMS | | 1 |
| VENDORS | PRODUCTS | | 1 |
| VENDORS | LINE_ITEMS | PRODUCTS | 2 |
| CODES | PRODUCTS | | 1 |
| CODES | LINE_ITEMS | PRODUCTS | 2 |
| PRODUCTS | LINE_ITEMS | | 1 |

To find the join path from SALESPEOPLE to ORDERS given the above table, the navigable paths are first computed. For SALESPEOPLE, there are two navigable paths, [SALESPEOPLE CUSTOMER ORDERS LINE_ITEMS] and [SALESPEOPLE ORDERS LINE_ITEMS]. For ORDERS, there is one path [ORDERS LINE_ITEMS]. The common LDT for SALESPEOPLE and ORDERS using either of the paths found for SALESPEOPLE is ORDERS. since there are two paths from SALESPEOPLE to ORDERS, we calculate the number of hops to be one using the [SALESPEOPLE ORDERS] path and two using the [SALESPEOPLE CUSTOMERS ORDERS] path. Without any path definitions in the conceptual layer, the SQL generator will use the shorter path.

As another example, to find the join path from ORDERS to PRODUCTS, the navigable paths are first computed in the same way. This yields the path [ORDERS LINE_ITEMS] for ORDERS, and [PRODUCTS LINE_ITEMS] for PRODUCTS. The common LDT for these paths is LINE_ITEMS. Following the table from ORDERS to LINE_ITEMS and then back up to PRODUCTS, the join path [ORDERS LINE_ITEMS PRODUCTS] is computed. This technique is one of several well know in the art and calculation of the join path is not limited to this technique in the present invention.

In the last example above, the LINE_ITEMS table is introduced in creating the join path. Step 436 adds any new tables introduced in the process of calculating the join path to the FROM clause in the internal SQL structure. Also included is an alias for the new table.

SQL requires the joins to be explicitly provided in the WHERE clause, and step 436 implements this. The primary and foreign key columns are stored in the conceptual layer either by the administrator or by Query System 1 after querying the user. Using the information, the following statement can be included in the WHERE clause to express the join of the above example if the alias for ORDERS, PRODUCTS and LINE_NUMBERS is T1, T2, and T3: "WHERE T1.PRODUCT#=T2.PRODUCTS# AND T2.PRODUCT#=T3.PRODUCT#"

D. Example Conversion of the Intermediate Language to SQL

The example below shows the steps in the conversion of a query in the intermediate language of the form "SHOW CUSTOMER NAME FOR CUSTOMERS THAT HAVE ORDERS OF ANY PRODUCT SORTED BY CUSTOMER CITY" to SQL code. First, in step 402, the query is tokenized into individual units, here marked by < >

<SHOW> <CUSTOMER NAME> <FOR> <CUSTOMERS>
<THAT HAVE> <ORDERS> <OF ANY> <PRODUCT>
<SORTED BY> <CUSTOMER CITY>

These are the words and phrases made into tokens. This distinction continues, but for purposes of the following steps, the < > around the tokens are not included. Next, in steps 404 and 406, the query is applied against the first set of patterns. The above query matches patterns 512, 556, 559, 571, and 581.

The patterns are applied in order of priority first and then order of location in the external text file. Since all patterns are either priority 2 or 5, the order in which the patterns above are listed are the order in which they are applied. Therefore, pattern 512 is applied, and the query becomes:

SHOW CUSTOMERS.NAME OFENTITY!! CUSTOMERS
WHERE ORDERS OF ANY PRODUCTS SORTED BY CUSTOMERS.CITY

The OFENTITY!! keyword is later used in converting to the internal SQL format and indicates that CUSTOMERS.NAME is a column of entity (table) CUSTOMERS. After the last pattern is applied, patterns 556 and 559 no longer match. Also, no new patterns match so patterns 571 and 581 remain. By Applying pattern 571, which has a higher priority, the query becomes:

```
SHOW CUSTOMERS.NAME OFENTITY!! CUSTOMERS
    WHERE ORDERS OF ANY PRODUCTS ORDERBY CUS-
    TOMERS.CITY
```

No new patterns are matched, and them is only one more pattern to match which, when applied, yields:

```
SHOW CUSTOMERS.NAME OFENTITY!! CUSTOMERS
    WHERE ORDERS >=1 PRODUCTS ORDERBY CUSTOM-
    ERS. CITY
```

Steps 408–412 are not applicable to this query, since there is no CREATE VIEW command needed for this type of query. If it were one of a specific set of queries which require CREATE VIEW SQL syntax, SQL Generator 20 would be called recursively to create the views. Since CREATE VIEW is not necessary, no new words or phrases for conversion were introduced.

In step 414, the query is broken into SQL components. The query then becomes:

```
SELECT CUSTOMERS.NAME WHERE ORDERS>=1 PROD-
    UCTS ORDER BY CUSTOMERS.CITY
```

The LAST-ENTITY variable is set to CUSTOMERS, since the last table added to the select clause is from the table CUSTOMERS. The OFENTITY!! keyword introduced in the last pattern match is helpful in determining the LAST-ENTITY.

In steps 416–418, the Where clause "ORDERS>=1 PRODUCTS" is applied to the patterns shown above, resulting in one match, with pattern 605. By applying this pattern, the internal SQL structure for the query becomes:

```
SELECT CUSTOMERS.NAME
FROM CUSTOMERS T1
WHERE EXISTS
    SELECT *
    FROM PRODUCTS T2
    WHERE EXISTS
        SELECT *
        FROM ORDERS T3
        JOIN PRODUCTS T2
        JOIN CUSTOMERS T1
ORDER BY CUSTOMERS.CITY
```

The LAST-ENTITY variable is assigned the table PRODUCTS.

In step 420, f there were any table names in the SELECT portion it would expand to include all of the tables columns. Also any virtual table would be expanded. Neither are present in this example, but are performed by simple substitution.

In step 422, any columns in the SORT BY portion are added to SELECT if not present. This step converts the SELECT portion of the internal SQL to:

```
SELECT CUSTOMERS.CITY, CUSTOMERS.NAME
```

The date conversion function of step 424 is not applicable, since there are no dates in this example. Similarly, there are no virtual columns for expansion in step 426.

If any aliases need to be specified to the FROM clause, they are made in step 428. This query created the alias during the application of the Where rules, and no other tables were added to the from clause. The aliases are then substituted into the other sections as well. The internal SQL becomes:

```
SELECT T1.CITY T1.NAME
FROM CUSTOMERS T1
WHERE EXISTS
    SELECT *
    FROM PRODUCTS T2
    WHERE EXISTS
        SELECT *
        FROM ORDERS T3
        JOIN PRODUCTS T2
        JOIN CUSTOMERS T1
ORDER BY T1.CITY
```

In step 430, the ORDER BY clause is converted to:

```
ORDER BY 1
```

In step 432, required joins are computed from the internal SQL. They are represented here by the "JOIN Table Alias" statement, and indicates that those tables need to join the table listed in the FROM clause above it. From the prior discussion on join path calculations, the join paths created from the statements:

```
FROM ORDERS T3

JOIN PRODUCTS T2

JOIN CUSTOMERS T1
``` are [CUSTOMERS ORDERS] and [ORDERS LINE_ITEMS PRODUCTS].

Then, in steps 434 and 436, since the join path calculation introduced a new table, LINE_ITEMS, the table needs to be added to the FROM clause with an alias to make:
FROM ORDERS T3, LINE_ITEMS T4

In step 438, the joins are created and added to the where clause from the join paths and foreign key information in the conceptual layer to produce the following Where clause:

```
WHERE T3.ORDER#=T4.ORDER#

AND T2.PRODUCT#=T4.PRODUCT#

AND T1.CUSTOMER#=T3.CUSTOMER#
```

Steps 440–444 are not applicable to this example. Finally, in step 446, the internal SQL structure, which is now represented as:

```
SELECT T1.CITY T1.NAME

FROM CUSTOMERS T1

WHERE EXISTS
    SELECT *
    FROM PRODUCTS T2
    WHERE EXISTS
        SELECT *
        FROM ORDERS T3.LINE_ITEMS T4
        WHERE T3.ORDER# = T4.ORDER#
            AND T2.PRODUCT# = T4.PRODUCT#
            AND T1.CUSTOMER# = T3.CUSTOMER#
ORDER BY 1
``` is convened to textual SQL. The above representation of the internal SQL structure is in proper textual structure for a query. The process of conversion to the textual query from the internal structure is a trivial step of combining the clauses and running through a simple parser.

What is claimed is:

1. A database query system for interactively creating, with a user, a syntactically and semantically correct query for a relational database having a plurality of tables, each of said tables having a plurality of columns and having a predetermined relationship to another of said tables, said system comprising:

a conceptual layer manager for storing conceptual information about the relational database, said conceptual information including structural information concerning the identity of each of the tables and columns and the directionality and cardinality of the relationships between the tables;

a query assistant user interface ("QAUI") presenting to the user a selectable table set of selectable tables from among the tables in the database, a selectable column set of selectable columns from among the columns of each of said tables in the database, and a selectable column operations set of selectable column operations on the columns, from which the user may select tables, columns, and column operations to construct a database query for said database in an intermediate query language, said QAUI further accepting from the user selections of tables, columns, and column operations;

a query assistant expert ("QAES") coupled to said QAUI to receive from said QAUI the identity of each table, column, or column operation selected by the user, said QAES returning to the QAUI after each selection by the user an updated version of said selectable table set, said selectable column set, and said selectable column operations set, said QAES excluding from said selectable sets any table, column, or column operation which, if selected by the user, would, based on the then-current state of the database query and said conceptual information, produce a semantically incorrect query.

2. The database query system of claim 1 wherein said QAES includes:

a storage system for maintaining state information about the current state of a database query; and a query expert logic system specifying to said QAUI said selectable sets by analyzing said state information maintained in said storage system and said conceptual information stored by said conceptual layer manager.

3. A database query system according to claim 2 wherein said storage system includes:

a set of state variables; and a set of access routines for adding deleting and modifying said state variables.

4. A database query system according to claim 2 wherein said storage system includes:

a state database, said state database containing said state information; and a set of database access routines for adding to, deleting from and modifying said state database.

5. A database query system according to claim 2 wherein said query expert logic system is composed of procedural logic.

6. A database query system according to claim 2 wherein said query expert logic system is a rule-based expert system.

7. A database query system according to claim 2 wherein said conceptual information further comprise one or more of the following: foreign keys, table join paths, table join expression for non-equijoins, virtual table definitions, virtual column definitions, table descriptions, column descriptions, hidden tables, and hidden columns.

8. A database query system according to claim 2 wherein said conceptual information further comprises table join expression for non-equijoins.

9. The database query system of claim 2 wherein if said current state of said database query includes an aggregate column operation on a column in a first table, said query expert logic system excludes from said selectable table set any other of said tables that is more detailed than said first table or is joinable with said first table only through another more detailed table.

10. The system of claim 2 wherein the database includes at least four tables and wherein if in the then-current state of said database query two of the tables are selected, said query expert logic system excludes from said selectable table set any other of said tables that does not form in combination with said two selected tables a navigable set.

11. The system of claim 2 wherein said query expert logic system excludes from said selectable column set for any selected one of said tables any numeric column for which, if in said current state of said database query an aggregate column operation is applied to another column based on said selected table or based on another table having a one-to-one relationship with said selected table.

12. A database query system according to claim 2 wherein said conceptual information further comprises virtual column definitions.

13. A database query system according to claim 12 wherein said virtual column definition contains primary key and foreign key references to define a join operation.

14. A database query system according to claim 1 wherein said each of said selectable table set, said selectable column set, and said selectable column operation set is mutually exclusive to a corresponding nonselectable table set, nonselectable column set, and nonselectable column operation set and is a subset of all tables, columns, and column operations, respectively, maintained by said conceptual layer manager which the user may next select in building a semantically correct database query.

15. A database query system according to claim 14 wherein said QAUI indicates to the user said selectable sets set of permissible selections and not displaying said nonselectable sets.

16. A database query system according to claim 14 wherein said QAUI displays said nonselectable sets and visually differentiates said selectable sets from said nonselectable sets.

17. A database query system according to claim 16 wherein said QAUI visually differentiates said sets by color.

18. A database query system according to claim 16 wherein said QAUI visually differentiates said selectable and nonselectable sets by type characteristic.

19. The database query system of claim 1 further comprising a query generator coupled to said QAUI to receive from said QAUI a completed database query in said intermediate query language, said query generator converting said query from said intermediate query language into a target query language different from said intermediate query language.

20. A database query system according to claim 19 wherein said target query language is Structured Query Language (SQL).

21. A database query system according to claim 19 wherein said query generator converts said intermediate language query into said target language by a set of successive transformations.

22. A database query system according to claim 21 wherein at least one of said set of successive transformations is transformation by pattern substitution.

23. A database query system according to claim 21 wherein said set of transformations comprises:

a set of structural transformations;

a set of transformation to include inferred information; and a set of transformations by pattern substitution.

24. A method for interactively building a syntactically and semantically correct query of a relational database from selections by a user, said database having a plurality of tables, each of said tables having a plurality of columns and having a predetermined relationship to another of said tables, said method comprising the steps of:

presenting to the user a selectable table set of selectable tables from among the tables in the database;

receiving from the user a selection of a first one of said selectable tables;

presenting to the user a selectable column set of selectable columns from among the columns based on said first selected table;

receiving from the user a selection of a first selected column from among said selectable columns;

presenting to the user a selectable column operation set of selectable column operations applicable to said first selected column;

receiving from the user a selection of one of said column operations;

presenting to the user a first updated version of said selectable table set from which the user may select a second selected table, said selectable table set excluding any table that is more detailed than said first selected table on which said selected column operation is applied or that is joinable with said first selected table only through a more detailed table if said selected column operation is an aggregate operation.

25. The method of claim 24 wherein said first updated version of said selectable table set further excludes any table that is not joinable with said first selected table.

26. The method of claim 25 wherein the database includes at least four tables and further comprising the steps of:

receiving from the user a selection of a second selected table from said first updated version of said selectable table set; and presenting to the user a second updated version of said selectable table set from which the user may select a third selected table, said selectable table set excluding any table the selection of which does not form in combination with said first and second selected tables a navigable set.

27. The method of claim 26 further comprising the steps of:

receiving from the user a selection of a second selected table from said first updated version of said selectable table set; and presenting to the user an updated version of said selectable column set based on said second selected table, said selectable columns set excluding any column that contains non-numeric information if said second selected table is the same as said first selected table or has a one-to-one relationship with said first selected table.

* * * * *